(12) United States Patent
Lee

(10) Patent No.: US 10,684,766 B2
(45) Date of Patent: Jun. 16, 2020

(54) MOBILE TERMINAL AND METHOD FOR CONTROLLING THE SAME

(71) Applicant: LG ELECTRONICS INC., Seoul (KR)

(72) Inventor: Byunghwa Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/452,306

(22) Filed: Jun. 25, 2019

(65) Prior Publication Data

US 2019/0310754 A1    Oct. 10, 2019

Related U.S. Application Data

(63) Continuation of application No. 15/805,013, filed on Nov. 6, 2017, now Pat. No. 10,387,027.

(30) Foreign Application Priority Data

Aug. 10, 2017    (KR) .................... 10-2017-0101768

(51) Int. Cl.
*G06F 3/0487*    (2013.01)
*G06F 3/041*    (2006.01)
(Continued)

(52) U.S. Cl.
CPC .......... *G06F 3/0487* (2013.01); *G06F 3/0414* (2013.01); *G06F 3/0488* (2013.01);
(Continued)

(58) Field of Classification Search
CPC ...... G06F 3/0487; G06F 3/0488; G06F 21/36; G06F 3/0484; G06F 3/0414; G06K 9/0061; H04B 1/3833
See application file for complete search history.

(56) References Cited

U.S. PATENT DOCUMENTS

2010/0079395 A1*   4/2010   Kim ..................... G06F 1/1626
                                                             345/173
2011/0069024 A1    3/2011   Kim
(Continued)

FOREIGN PATENT DOCUMENTS

EP         2816442        12/2014

OTHER PUBLICATIONS

European Patent Office Application Serial No. 17208288.5, Search Report dated May 17, 2018, 8 pages.
(Continued)

*Primary Examiner* — Stephen G Sherman
(74) *Attorney, Agent, or Firm* — Lee, Hong, Degerman, Kang & Waimey

(57) ABSTRACT

A mobile terminal includes: a body including a front surface, and side surfaces connected to the front surface; a touch screen disposed at the front surface, and configured to display a user interface in a first display state; a grip sensor configured to sense an external force applied to side surfaces of the body; and a controller configured to display the user interface in an intermediate state between the first display state and a second display state, if an external force applied to side surfaces of the body is sensed through the grip sensor, while the user interface is displayed in the first display state.

16 Claims, 31 Drawing Sheets

(51) Int. Cl.
*G06F 3/0488* (2013.01)
*G06F 21/36* (2013.01)
*G06K 9/00* (2006.01)
*H04B 1/3827* (2015.01)
*G06F 3/0484* (2013.01)

(52) U.S. Cl.
CPC ........... *G06F 21/36* (2013.01); *G06K 9/0061* (2013.01); *H04B 1/3833* (2013.01); *G06F 3/0484* (2013.01)

(56) References Cited

U.S. PATENT DOCUMENTS

| | | | |
|---|---|---|---|
| 2011/0291945 A1* | 12/2011 | Ewing, Jr. | G06F 1/1686 345/173 |
| 2012/0179969 A1* | 7/2012 | Lee | G06F 1/1626 715/719 |
| 2014/0033298 A1* | 1/2014 | Park | G06F 21/32 726/17 |
| 2014/0168135 A1* | 6/2014 | Saukko | G06F 1/1684 345/174 |
| 2015/0160770 A1 | 6/2015 | Stewart et al. | |
| 2016/0026316 A1 | 1/2016 | Choi et al. | |
| 2017/0277874 A1* | 9/2017 | Lee | G06F 3/041 |
| 2019/0050128 A1 | 2/2019 | Lee | |

OTHER PUBLICATIONS

United States Patent and Trademark Office U.S. Appl. No. 15/805,013, Office Action dated Oct. 12, 2018, 20 pages.

\* cited by examiner

MOBILE TERMINAL AND METHOD FOR CONTROLLING THE SAME

CROSS-REFERENCE TO RELATED APPLICATION

This application is a continuation of U.S. patent application Ser. No. 15/805,013, filed on Nov. 6, 2017, now U.S. Pat. No. 10,387,027, which claims the benefit of earlier filing date and right of priority to Korean Application No. 10-2017-0101768, filed on Aug. 10, 2017, the contents of which are all hereby incorporated by reference herein in their entirety.

BACKGROUND OF THE INVENTION

1. Field of the Invention

This specification relates to a mobile terminal, and a method for controlling the same by using an external force applied to side surfaces.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

As the mobile terminal becomes multi-functional, a control method of the mobile terminal becomes complicated, and inefficiency occurs thereby. In order to solve such problems, developing methods for manipulating a user interface in a novel manner is increasingly required.

SUMMARY OF THE INVENTION

Therefore, an aspect of the detailed description is to provide a user's manipulation method capable of efficiently performing a complicated operation of a mobile terminal.

To achieve these and other advantages and in accordance with the purpose of this specification, as embodied and broadly described herein, there is provided a mobile terminal, comprising: a body including a front surface, and side surfaces connected to the front surface; a touch screen disposed at the front surface, and configured to display a user interface in a first display state; a grip sensor configured to sense an external force applied to side surfaces of the body; and a controller configured to display the user interface in an intermediate state between the first display state and a second display state, if an external force applied to side surfaces of the body is sensed through the grip sensor, while the user interface is displayed in the first display state, wherein the controller determines whether an intensity of the external force reaches a preset intensity before the sensing of the external force is terminated, wherein if the intensity of the external force reaches the preset intensity as a result of the determination, the controller displays the user interface in the second display state, and wherein if the intensity of the external force does not reach the preset intensity, the controller displays the user interface in the first display state, in response to the termination of the sensing of the external force.

In an embodiment, the intermediate display state is a preview of the second display state of the user interface before the second display state is displayed.

In an embodiment, if the intensity of the external force sensed through the grip sensor is less than a preset minimum intensity, the controller maintains the first display state of the user interface.

In an embodiment, the touch screen is in one of an off state that visual information is not displayed because a lamp of the touch screen is turned off, and an on state that visual information is displayed because the lamp of the touch screen is turned on. The controller converts the touch screen to an on state if an external force more than the preset minimum intensity is sensed through the grip sensor in an off state of the touch screen. And the controller displays a lock screen indicating a locked state, on the touch screen which is in the on state.

In an embodiment, if the intensity of the external force reaches a preset intensity before the sensing of the external force is terminated, the controller displays a lock screen indicating a function to release a locked state through an iris recognition, on the touch screen. And if the intensity of the external force does not reach the preset intensity before the sensing of the external force is terminated, the controller displays a lock screen indicating a function to release a locked state through a password input rather than an iris recognition, on the touch screen.

In an embodiment, the mobile terminal further comprises a proximity sensor configured to sense a user's palm positioned near a front surface of the body. The touch screen further comprises an intermediate state between an off state and an on state, where only preset visual information is displayed as a part of a lamp of the touch screen is turned on. If the touch screen is in the off state, and if an external force applied to side surfaces of the body is sensed through the grip sensor in a state that the user's palm is near the front surface of the body, the controller converts the touch screen from the off state into the intermediate state.

In an embodiment, the controller performs a different operation related to the user interface, based on an intensity of the external force sensed through the grip sensor.

In an embodiment, the controller displays a home screen page on the touch screen, if the external force having the preset intensity is sensed for more than a predetermined time.

In an embodiment, the grip sensor is formed to sense an external force applied to both side surfaces of the body. If the external force applied to the both side surfaces of the body has different intensities, the controller performs a different operation related to the user interface, based on a side surface where a higher intensity of the external force is sensed.

In an embodiment, the body has one of a vertical posture that a lengthwise direction of the body is parallel to a gravitational direction, and a horizontal posture that the lengthwise direction of the body is perpendicular to the gravitational direction. And if the intensity of the external force reaches the preset intensity, the controller performs a different operation related to the user interface according to a posture of the body.

In an embodiment, the touch screen is formed to sense a touch input of a finger which has contacted the touch screen. And if a touch input applied to the touch screen and a user input corresponding to the external force applied to the side surfaces of the body are simultaneously sensed, the controller responds to one of the touch input and the user input corresponding to the external force, based on a preset priority.

In an embodiment, the preset priority is set such that the touch input has a higher priority than the user input corresponding to the external force regardless of a user interface, or the preset priority is set so as to be variable according to a type of a user interface.

In an embodiment, the mobile terminal further comprises a camera configured to capture an image. And in a state that a preview image is displayed on the touch screen, the controller performs a zoom-in function with respect to the preview image according to the intensity of the external force sensed through the grip sensor.

According to another aspect of the present invention, there is provided a mobile terminal, including: a body including a front surface, and side surfaces extended from the front surface; a touch screen disposed at the front surface of the body; one or more sensors disposed at the side surfaces of the body, and configured to sense an external force applied to the side surfaces of the body; one or more processors; a memory; and one or more programs stored in the memory and executed by the one or more processors, wherein the one or more programs include commands for: displaying a user interface on the touch screen in a first display state; sensing an external force applied to the side surfaces of the body while the user interface is displayed in the first display state; displaying the user interface in an intermediate display state between the first display state and a second display state, in response to the sensing of the external force applied to the side surfaces of the body; terminating the sensing of the external force; displaying the user interface in the second display state in response to the termination of the sensing of the external force, if an intensity of the external force reaches a preset intensity before the termination of the sensing of the external force; and displaying the user interface in the first display state in response to the termination of the sensing of the external force, if the intensity of the external force does not reach the preset intensity before the termination of the sensing of the external force.

In an embodiment, the one or more programs include commands for executing a different operation related to the user interface according to the intensity of the external force.

In an embodiment, the one or more programs include commands for displaying a home screen page indicating a standby state of the mobile terminal on the touch screen, if a preset time passes after the intensity of the external force reaches the preset intensity.

In an embodiment, the intermediate display state is a preview of the second display state of the user interface before the second display state is displayed.

In an embodiment, the touch screen is formed to sense a touch input of a finger which has contacted the touch screen. And if a touch input applied to the touch screen and a user input corresponding to the external force applied to the side surfaces of the body are simultaneously sensed, the one or more programs include commands for responding to one of the touch input and the user input corresponding to the external force, based on a preset priority.

To achieve these and other advantages and in accordance with the purpose of this specification, as embodied and broadly described herein, there is also provided a method for controlling a mobile terminal including a grip sensor configured to sense an external force applied to side surfaces of a body, the method including: displaying a user interface on a touch screen in a first display state; sensing an external force applied to the side surfaces of the body while the user interface is displayed in the first display state; displaying the user interface in an intermediate display state between the first display state and a second display state, in response to the sensing of the external force applied to the side surfaces of the body; determining whether an intensity of the external force reaches a preset intensity, before the sensing of the external force is terminated; and displaying the user interface in the second display state if the intensity of the external force reaches the preset intensity, and displaying the user interface in the first display state if the intensity of the external force does not reach the preset intensity before the termination of the sensing of the external force.

In an embodiment, the intermediate display state is a preview screen of the second display state.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
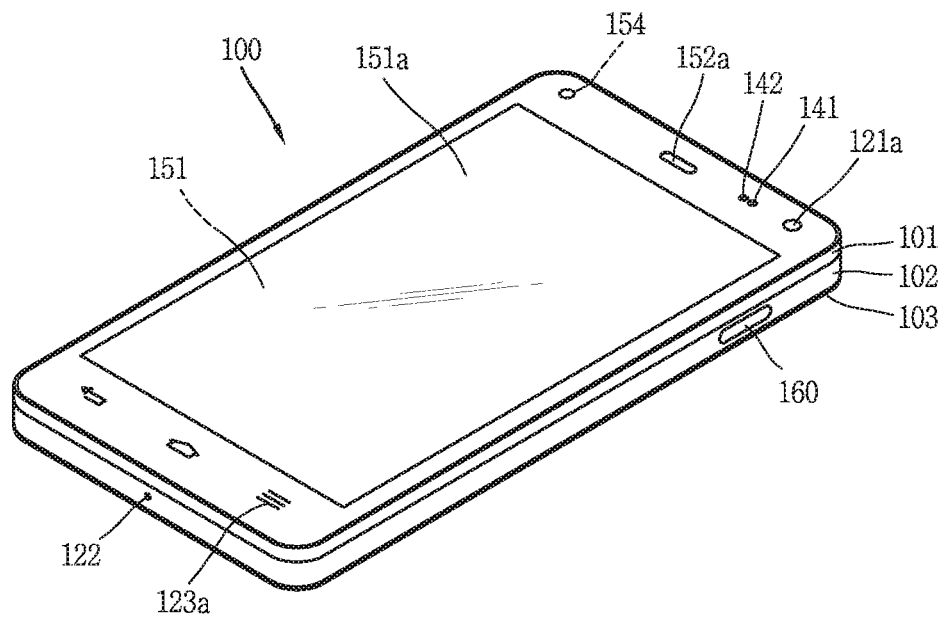
FIGS. 1A and 1B are conceptual views illustrating an example of a mobile terminal according to the present invention, which are viewed from different directions.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
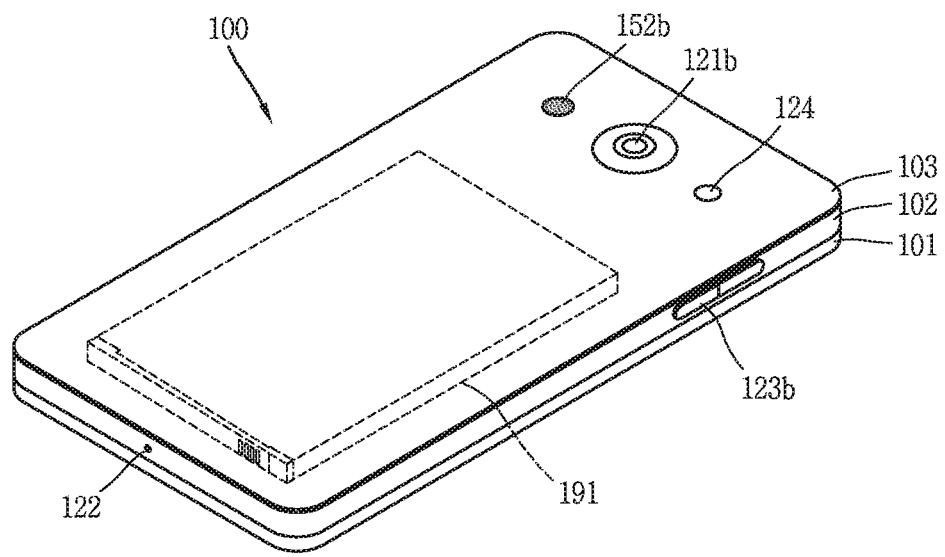

FIGS. 1A and 1B are conceptual views of one example of the mobile terminal, viewed from different directions.

Hereinafter, description will be given of an exemplary terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1A and 1B.

Here, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the terminal 100. For example, the display unit 151 may display execution screen information of an application program driven in the terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented using two or more displays. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not shown) on a rear surface of the window 151a or patterned directly on the rear surface of the window 151a. Alternatively, the touch sensor may be integrally formed with the display. For example, the touch sensor may be disposed on a substrate of the display or within the display.

The display unit 151 may form a touch screen together with the touch sensor. Here, the touch screen may serve as the user input unit 123. Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the terminal 100.

The optical output module 154 may output light for indicating an event generation. Examples of the event generated in the terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 6) may be retractable into the terminal body. Alternatively, an antenna may be formed in a form of film to be attached onto an inner surface of the rear cover 103 or a case including a conductive material may serve as an antenna.

A power supply unit 190 (refer to FIG. 6) for supplying power to the terminal 100 may be disposed on the terminal body. The power supply unit 190 may include a battery 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the terminal 100 may further be provided on the terminal 100. As one example of the accessory, a cover or pouch for covering or accommodating at least one surface of the terminal 100 may be provided. The cover or pouch may cooperate with the display unit 151 to extend the function of the terminal 100. Another example of the accessory may be a touch pen for assisting or extending a touch input onto a touch screen.

The mobile terminal according to the present invention may sense a user's gesture to grip the body of the mobile terminal, and may control its operation based on the sensed gesture. Hereinafter, a grip sensor for sensing such a gesture to grip the body of the mobile terminal will be explained.

Figure 2A:
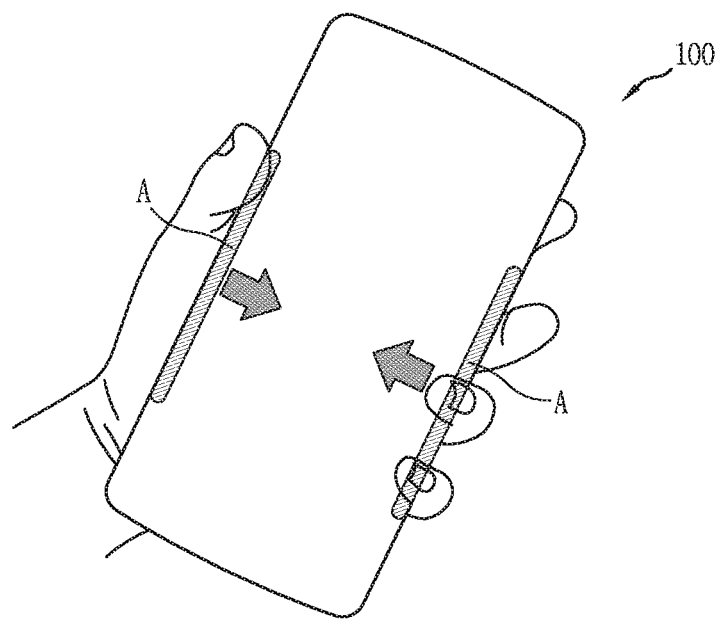
FIGS. 2A to 2C are conceptual views for explaining a grip sensor mounted to a mobile terminal.
Figure 2B:
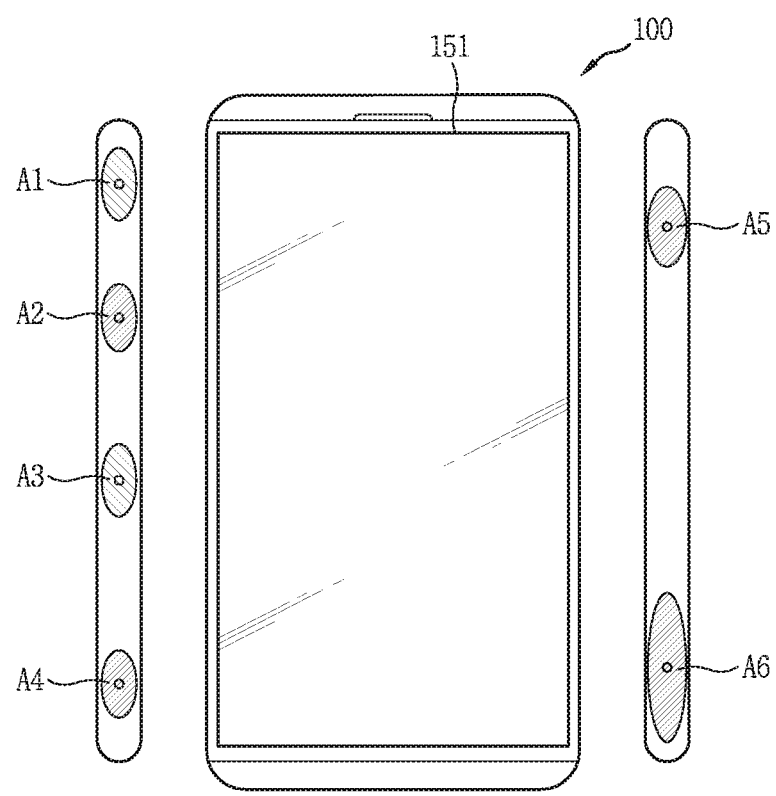

FIGS. 2A and 2B are conceptual views for explaining a grip sensor mounted to the mobile terminal.

Referring to FIG. 2A, a user may apply an external force to side surfaces of the mobile terminal through an operation to grip the body of the mobile terminal. The grip sensor may be arranged on side surfaces of the body of the mobile terminal so as to sense an external force applied to the side surfaces of the body of the mobile terminal.

The grip sensor may be arranged at both side surfaces of the mobile terminal, and may be formed as one or more sensors. For instance, as shown in FIG. 2B, the grip sensor may be arranged at a plurality of regions (A1, A2, A3, A4, A5, A6) on side surfaces of the body of the mobile terminal, and a plurality of grip sensors may be arranged at the plurality of regions (A).

Each of the grip sensors senses a pressure applied to at least one of the plurality of regions, and the controller 180 executes a function corresponding to each region based on the pressure sensed by said each grip sensor. Areas sensed by the grip sensors may be set to be different from each other, and a distance between the grip sensors may not be constant.

Figure 2C:
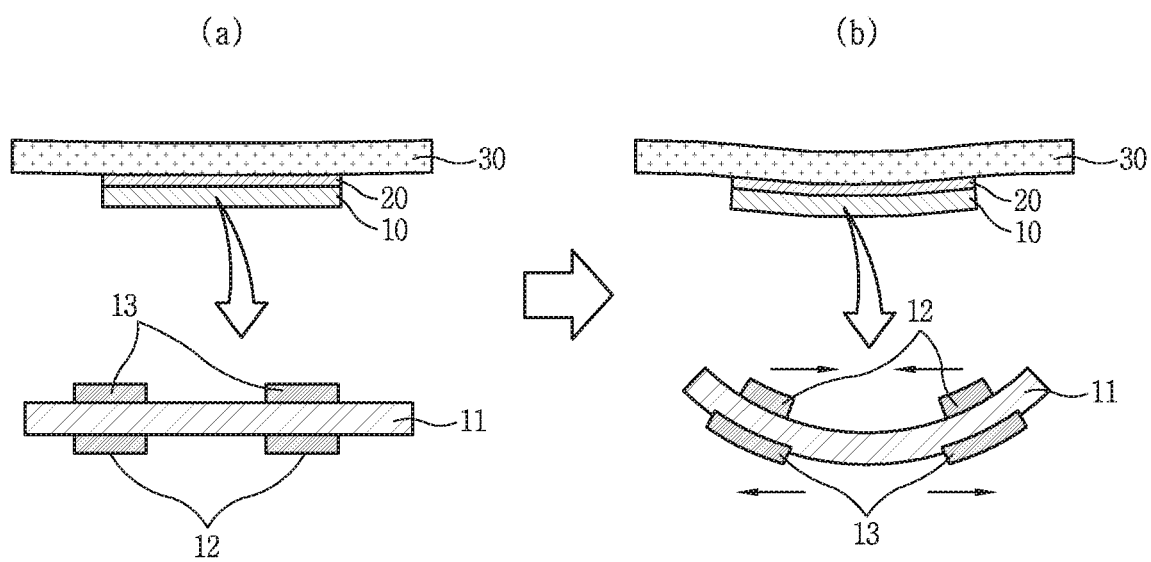

FIG. 2C is a conceptual view showing the grip sensor attached onto a substrate.

As shown in FIG. 2C, the grip sensor may be mounted to a substrate 30 which forms the appearance of the mobile terminal.

The substrate 30 may correspond to the front case 101 (refer to FIGS. 1A and 1B) which forms an inner space of the mobile terminal. In the following descriptions, the front case 101 serves as the substrate 30. However, the present invention is not limited to this. That is, the rear case 102 may serve as the substrate 30. In the present invention, if there is a middle case between the front case 101 and the rear case 102, the middle case may serve as the substrate 30.

The grip sensor 10 may be fixed to the substrate 30 by an adhesive member 20. Thus, the substrate 30 is transformed by a pressure applied thereto, and the grip sensor 10 may sense the pressure applied to the substrate 30 based on a change of a resistance value of a transformation member due to a transformation of the substrate 30.

More specifically, the grip sensor 10 may include a base substrate 11, and first and second transformation members 12, 13 formed on both surfaces of the base substrate 11. If each of the first and second transformation members 12, 13 are formed in plurality, the first and second transformation members 12, 13 may be arranged on the base substrate 11 in a spaced manner from each other.

If a pressure (F) is applied to the substrate 30 having the grip sensor 10 attached thereto, the substrate 30 is transformed. If the substrate 30 is transformed in a direction that the pressure (F) is applied, the base substrate 11 is also bent in the same direction. Here, the first and second transformation members 12, 13 formed on both surfaces of the base substrate 11 are transformed in opposite directions. More specifically, the first transformation member 12 may be contracted by the transformation of the base substrate 11, and the second transformation member 13 may be expanded by the transformation of the base substrate 11. Accordingly, the first transformation member 12 of the grip sensor 10 may have its resistance value lowered by contraction, and the second transformation member 13 of the grip sensor 10 may have its resistance value increased by expansion. The controller 180 may sense a change of the resistance values of the first and second transformation members 12, 13, thereby obtaining information on whether a pressure has been applied to the side surfaces, information on a degree of the pressure, and information on an application direction of the pressure.

The front case may be formed of a material having an excellent electrical property such that a transformation due to an external force may be sensed. For instance, the front case may be formed of a metallic material, a plastic material having an excellent electrical property (PBT resin), etc.

So far, an implementation method of the grip sensor has been explained. Hereinafter, a structure to arrange the grip sensor at the front case will be explained.

FIGS. 3A to 3D are conceptual views showing a state that grip sensors are arranged on a main circuit board of the mobile terminal according to the present invention.

Figure 3A:
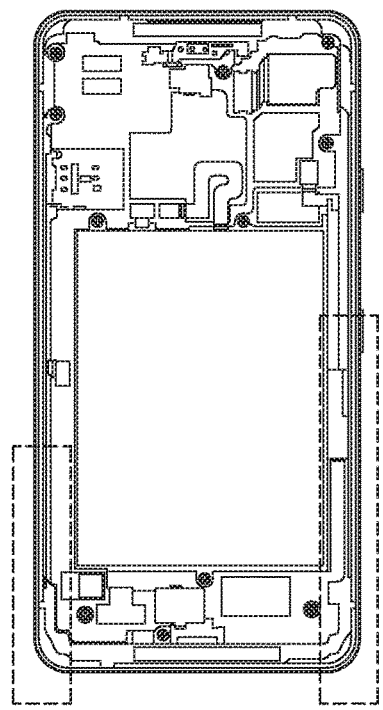
FIGS. 3A to 3D are conceptual views showing a state that a grip sensor is arranged on a main circuit board of a mobile terminal according to the present invention.

As shown in FIG. 3A, the grip sensors may be attached to a left side surface and a right side surface of the mobile terminal. Measurement ranges of the grip sensors attached to the two side surfaces with respect to an external force may be different from each other. For instance, the grip sensor attached to the left side surface may have a narrower measurement range than the grip sensor attached to the right side surface.

Unlike FIG. 3A, the grip sensors attached to the two side surfaces may measure an external force on their entire regions.

The grip sensors may be electrically connected to a main circuit board of the mobile terminal through a flexible printed circuit board connected to the grip sensors. Thus, the controller 180 may receive sensing information sensed by the grip sensors.

Figure 3B:
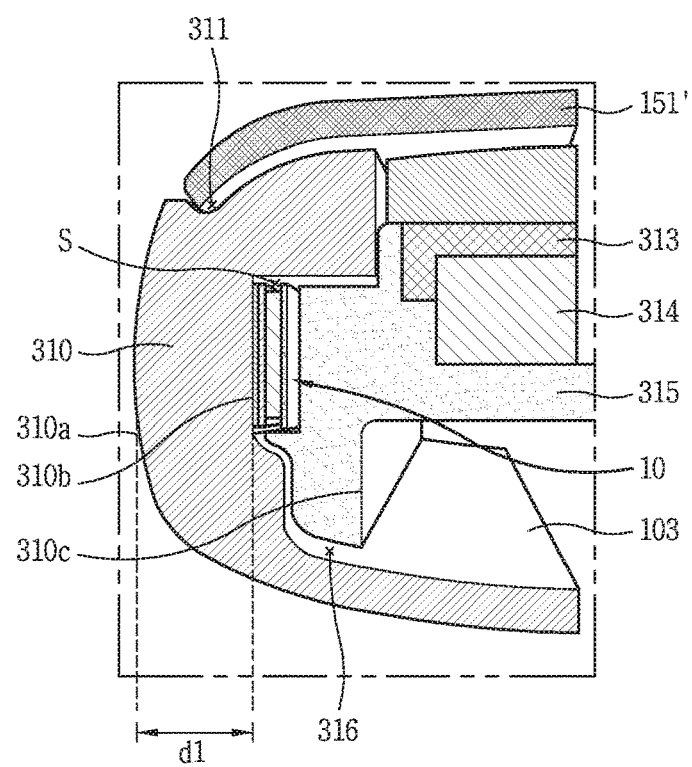

FIG. 3B is a view showing a sectional surface of the front case of the mobile terminal according to the present invention.

The front case 310 includes an extended portion 311 extended from one region of the front case 310 and configured to support the display unit 151. The rear cover 103 is mounted to another region of the front case 310 where the extended portion 311 does not exist.

Referring to FIG. 3B, the front case 310 includes a mounting space (S) recessed from an inner surface 310b which constitutes an inner space of the mobile terminal.

The grip sensor 10 may be attached to the recessed inner surface 310b by using an adhesive member. A recessed width of the mounting space (S) may be equal to or larger than a thickness of the grip sensor 10. Thus, the grip sensor 10 may be arranged at the mounting space (S), so as to constitute one surface of the inner space together with the inner surface 310b.

The front case 310 has a first thickness (d1) from an outer surface 310a of the mobile terminal to the inner surface 310b. Since the front case 310 is provided with the recessed mounting space, an intensity of the front case 310 may be lowered than that when a mounting space is not provided at the front case 310. Since the front case 310 is better transformed by an external force, the external force applied to the front case 310 may be transferred to the grip sensor 10 more effectively.

A supporting member 315 for fixing the grip sensor 10, and/or other electronic components are arranged at the inner space where the grip sensor 10 has been arranged. Thus, the grip sensor 10 may be supported by the supporting member 315 and/or other electronic components. Accordingly, in the present invention, an intensity of the inner space may be obtained, and separation of the grip sensor due to transformation of the front case may be prevented.

Figure 3C:
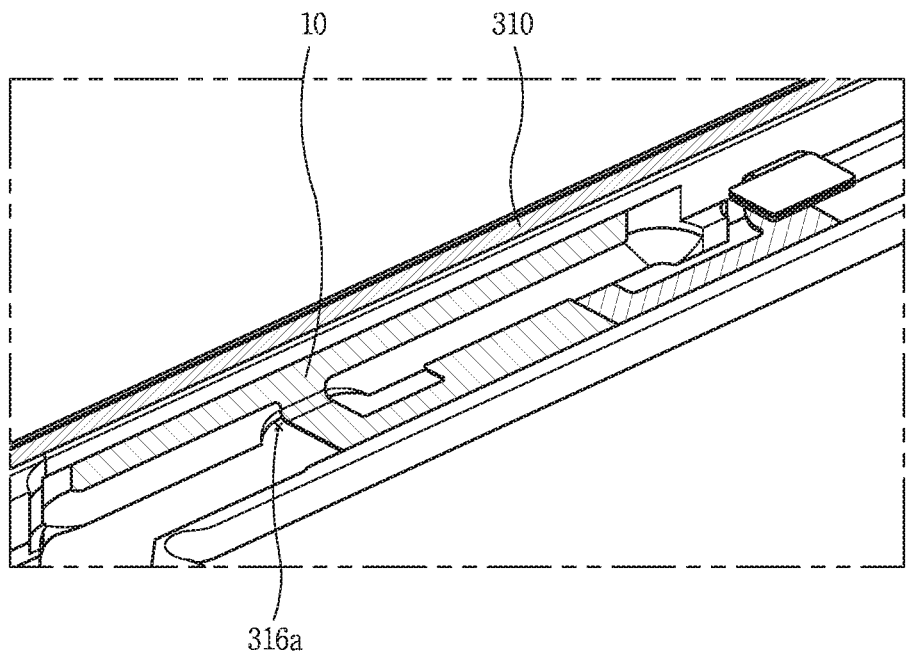
Figure 3D:
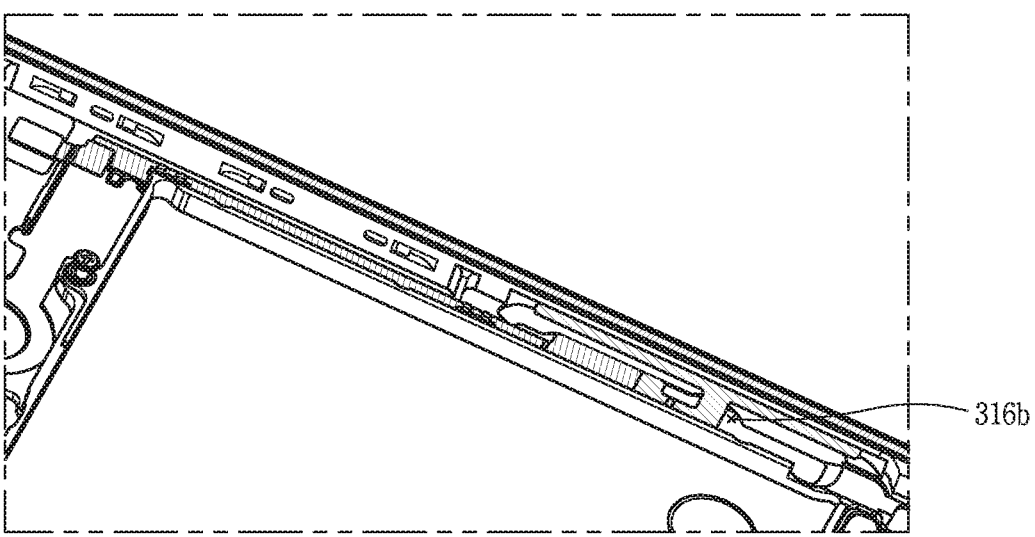

Referring to FIGS. 3C and 3D, the front case may be extended to one region to support an edge of the display unit 151. The one region of the front case may include a guide groove 316 configured to support a flexible printed circuit board (FPCB) electrically connected to the main circuit board of the mobile terminal 100 by being extended from the grip sensor 10. The guide groove 316 may be formed as a groove recessed from the inner surface such that the FPCB connected to the grip sensor 10 disposed on the side surface is bendable. Thus, the guide groove 316 may obtain a space where the FPCB is bendable.

So far, has been explained a structure of the mobile terminal where the grip sensor has been mounted.

Figure 4A:
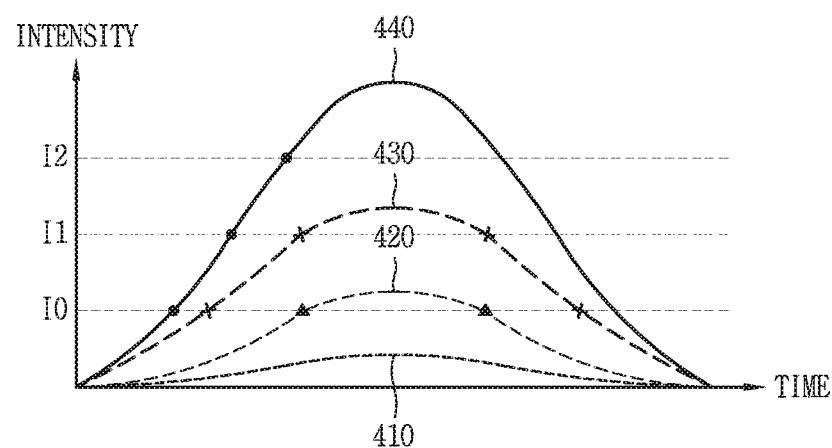
FIGS. 4A to 4C are graphs showing an external force sensed by a grip sensor.
Figure 4B:
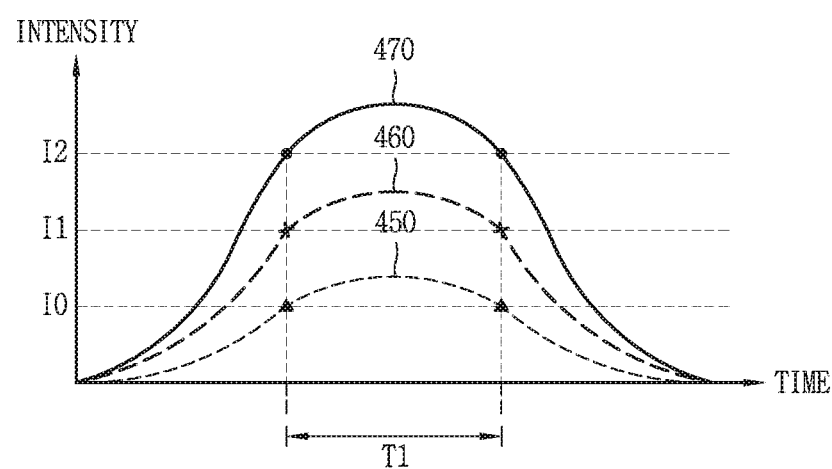
Figure 4C:
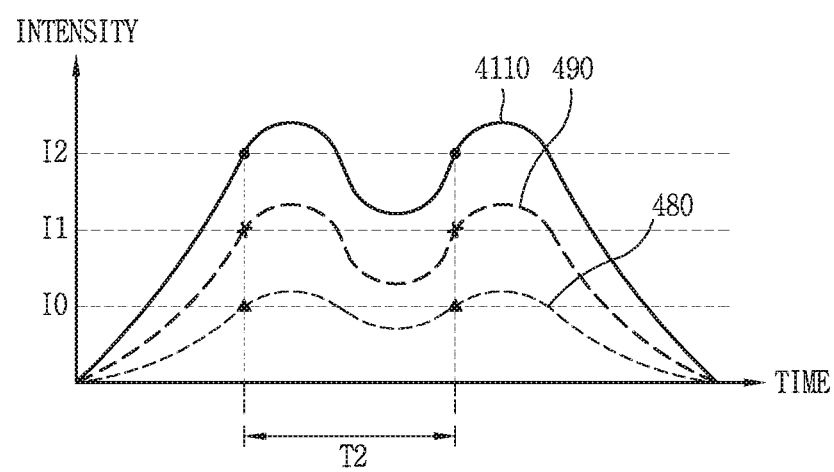

Hereinafter, will be explained a type of a user input which can be sensed by such a grip sensor. FIGS. 4A to 4C are graphs showing an external force sensed by the grip sensor.

The mobile terminal of the present invention may be formed to sense, by a user, an external force applied to side surfaces of the body. The memory 170 of the mobile terminal may set a plurality of reference intensities such that a current external force may be distinguished according to its intensity. More specifically, a reference intensity of an external force sensed by the grip sensor, determined as a user input may be set as I0 (i). A reference intensity of an external force, which satisfies a first reference condition may be set as I1 (ii). And a reference intensity of an external force, which satisfies a second reference condition may be set as I2 (iii). Alternatively, three or more reference intensities may be set by selection or a user or a manufacturing company of the mobile terminal.

The controller 180 may determine a user input corresponding to an external force, based on sensing information of the external force sensed by the grip sensor 10. The user input corresponding to an external force may be called a grip gesture input. The controller 180 may determine the user input corresponding to an external force, based on at least one of an intensity of an external force, a time when an external force is applied, the number of times that an external force is applied, and a position where an external force is applied.

For instance, referring to FIG. 4A, as shown in a first graph 410, an intensity of an external force may be less than I0. In this case the controller 180 may ignore the sensed external force. Thus, in the present invention, a user's mere operation to hold the mobile terminal for usage may be prevented from being erroneously recognized as a user input.

If the intensity of the external force is more than the I0 as shown in second to fourth graphs 420, 430, 440, the controller 180 may determine a user's operation as a user input.

Here, the controller 180 may determine the user's operation as an input of a different user, according to the intensity of the external force indicated by each graph. Thus, the controller 180 may execute a different function according to a user input corresponding to an external force indicated by each graph.

Further, the controller 180 may determine that a different user input has been applied, based on at least one of an external force time and an external force intensity. Referring to FIG. 4B, if an external force having more than a predetermined intensity is applied for more than a preset time (T1), the controller 180 may determine that a user input corresponding to the external force is different from that corresponding to an external force applied for less than the preset time (T1). Such an external force continuously applied for more than a preset time may be called a long grip gesture. Further, such an external force sensed for less than a preset time may be called a short grip gesture.

The controller 180 may recognize an external force as a different user input according to an intensity of the external force, even under a long grip gesture. For instance, the controller 180 may determine an external force indicated by a fifth graph 450, an external force indicated by a sixth graph 460, and an external force indicated by a seventh graph 470, as different user inputs. Thus, the controller 180 may execute a different function according to a user input corresponding to each external force.

Further, the controller 180 may determine a user input corresponding to an external force, according to the number of times that an external force is applied. More specifically, if an external force having more than a predetermined intensity is sensed two times or more within a predetermined time (T2), the controller 180 may determine the external force as a double grip gesture. In case of the double grip gesture, an external force may be sensed two times or more within a predetermined time (T2), unlike a short grip gesture or a long grip gesture. The predetermined time (T2) may be a very short time. Thus, a user should consecutively apply an external force two times or more within a short time, in order to apply a double grip gesture input to the mobile terminal. For instance, as shown in an eighth graph 480 of FIG. 4C, if an external force having an intensity of I0~I1 is sensed two times or more within T2, the controller 180 may determine the external force as a double grip gesture.

As aforementioned, even if an external force is sensed two times or more within T2, the controller 180 may determine the external force as a different user input according to an intensity of the external force. Thus, the eighth graph 480, a ninth graph 490 and a tenth graph 4110 are graphs showing different user inputs. So far, has been explained a user input in a case where external forces applied to both side surfaces have the same intensity or similar intensities.

Figure 5A:
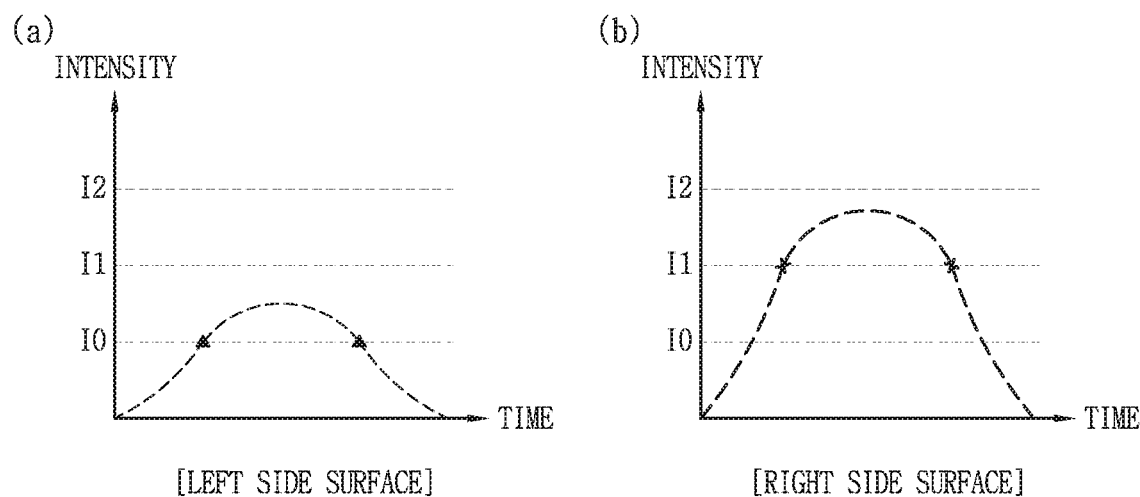
FIGS. 5A and 5B are conceptual views showing that external forces applied to both side surfaces can be differently measured.
Figure 5B:
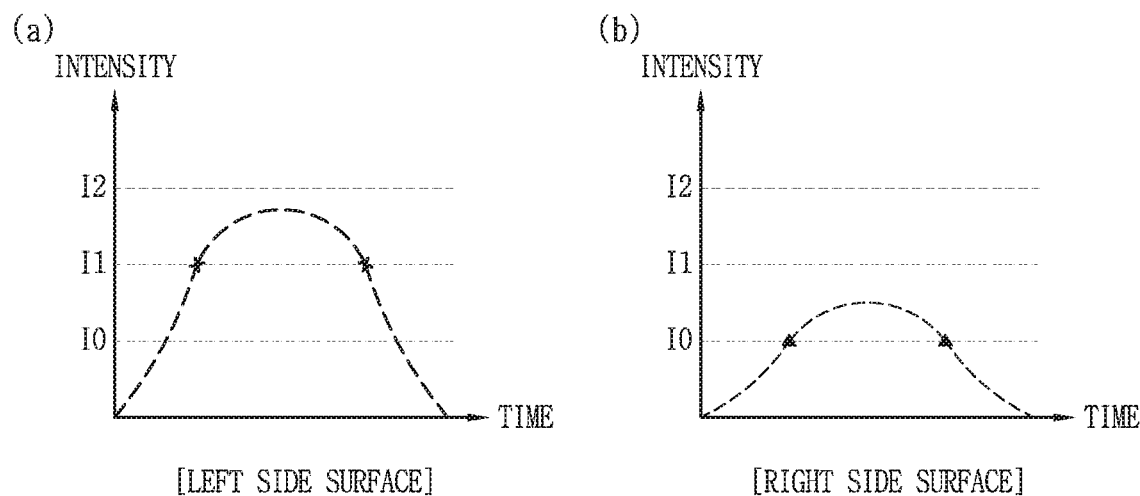

Hereinafter, will be explained a user input in a case where external forces applied to both side surfaces have different intensities. FIGS. 5A and 5B are conceptual views showing that external forces applied to both side surfaces can be differently measured.

The controller 180 may receive sensing information on external forces having different intensities and sensed by grip sensors disposed at both side surfaces of the mobile terminal.

More specifically, if a difference of maximum values of intensities of external forces applied to a left side surface and a right side surface is less than a specific value, the controller 180 may determine the external forces as external forces having the same intensity or similar intensities. On the other hand, if a difference of maximum values of intensities of external forces applied to a left side surface and a right side surface is more than a specific value, the controller 180 may determine the external forces as external forces having different intensities.

In case of external forces having the same intensity or similar intensities, the controller 180 may determine a user input based on an average intensity or a higher intensity, in the manner aforementioned in FIGS. 4A to 4C.

In case of external forces having different intensities, the controller 180 may determine a user input based on a position where an external force having a higher intensity is applied. For instance, as shown in FIGS. 5A(a) and (b), an external force applied to a right side surface has a higher intensity than that applied to a left side surface. Accordingly, the controller 180 may determine a user input based on the intensity of the external force applied to the right side surface. And the controller 180 may perform a specific function based on the user input corresponding to the external force applied to the right side surface. Likewise, as shown in FIGS. 5B(a) and (b), an external force applied to a left side surface has a higher intensity than that applied to a right side surface. Accordingly, the controller 180 may perform a specific function based on the external force applied to the left side surface.

The mobile terminal according to the present invention may be further provided with a touch sensor for sensing a touch input applied to a side surface. In this case, the controller 180 may sense the touch input applied to the side surface, together with a user input corresponding to an external force.

Although not shown, the touch sensor may have a layered structure with a grip sensor. For instance, the touch sensor and the grip sensor may be sequentially arranged on an outer surface which forms the side surfaces of the mobile terminal.

If an external force having an intensity less than 10 is applied, the controller 180 may recognize the external force as a touch input of a finger which applies an external force having an intensity less than I0. That is, the controller 180 may distinguish a touch input from a user input corresponding to an external force, according to an intensity of the external force. The touch input applied to the side surface may have the same type as a touch input applied to the touch screen. For instance, various types of touch inputs such as a drag input, a multi-touch input, a short touch input, a long touch input and a pinch in/out input may be applied to the side surface.

The mobile terminal according to the present invention may control an activated state of the touch sensor which has a layered structure with the touch screen 151, based on an external force applied to side surfaces. More specifically, in an off state of the touch screen 151, the controller 180 may deactivate the touch sensor such that a touch input may not be sensed. The controller 18 may activate the touch sensor based on an external force applied to side surfaces in an off state of the touch screen 151 and sensed by a grip sensor. That is, if an external force is applied to side surfaces, the controller 180 may sense a touch input by activating the touch sensor, even in an off state of the touch screen 151.

So far, has been explained various user inputs based on an external force applied to side surfaces of the mobile terminal. Hereinafter, will be explained a method for controlling the mobile terminal using such a user input.

Figure 6:
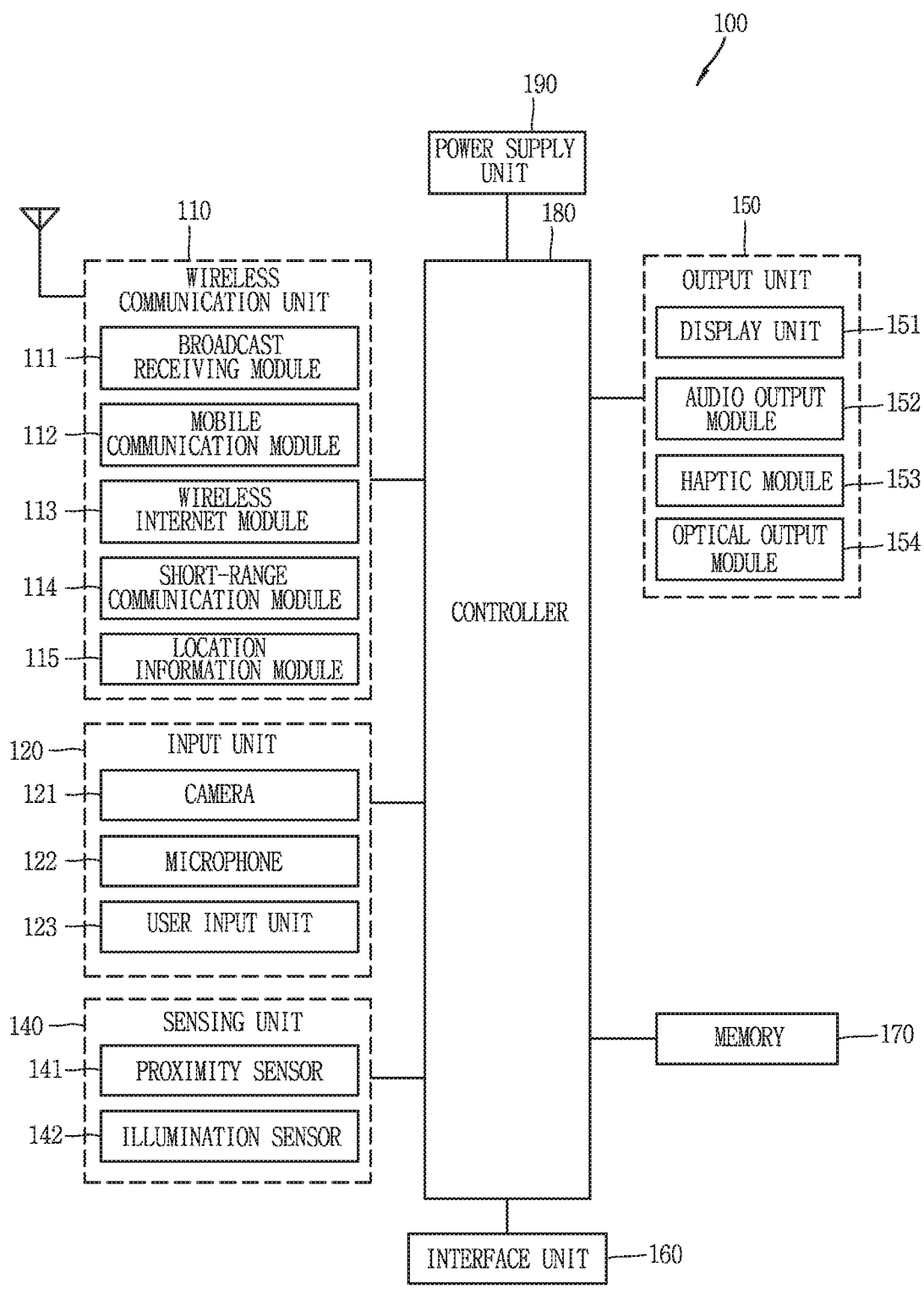
FIG. 6 is a block diagram illustrating a mobile terminal according to the present invention.

FIG. 6 is a block diagram of a mobile terminal in accordance with the present invention.

Referring to FIG. 6, the mobile terminal 100 is shown having components such as a wireless communication unit 110, an input unit 120, a learning data unit 130, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 6, or activating application programs stored in the memory 170. As one example, the controller 180 controls some or all of the components illustrated in FIG. 6 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of those elements and components may be combined to implement operation and control of the terminal or a control method of the terminal according to various exemplary embodiments described herein. Also, the operation and control or the control method of the terminal may be implemented in the terminal in such a manner of activating at least one application program stored in the memory 170.

Various embodiments described herein may be implemented in a computer-readable medium, a machine-readable medium, or similar medium using, for example, software, hardware, or any combination thereof.

Figure 7:
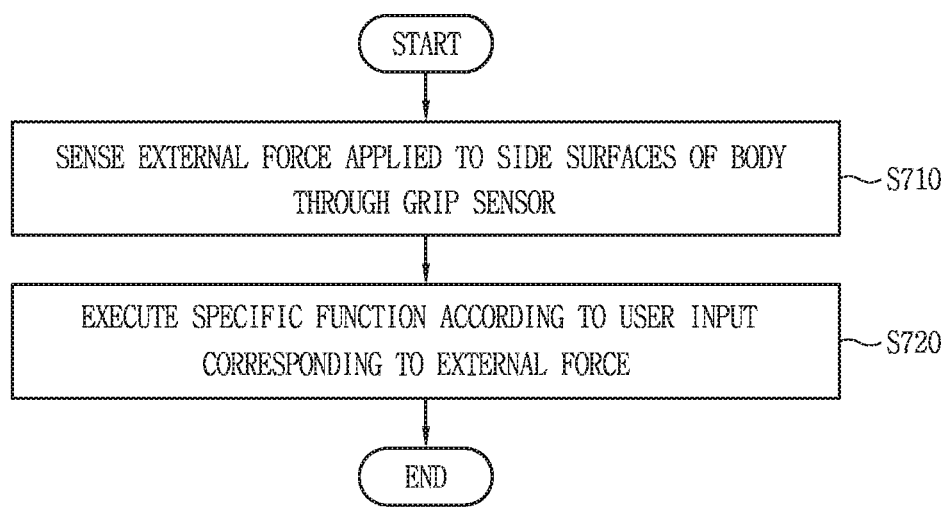
FIG. 7 is a flowchart showing an operation method of a mobile terminal according to the present invention.

Hereinafter, an operation method of the mobile terminal which includes at least one of the components of FIG. 6 using a grip sensor will be explained. FIG. 7 is a flowchart showing an operation method of the mobile terminal according to the present invention, and FIGS. 8A to 15B are conceptual views for explaining the operation method shown in FIG. 7.

Referring to FIG. 7, the mobile terminal according to the present invention may sense an external force applied to side surfaces of the body, by a grip sensor (S710).

The grip sensor of the mobile terminal according to the present invention may sense an external force applied to side surfaces of the body in real time, if power is supplied to the mobile terminal. The controller 180 may determine a user input corresponding to the external force sensed by the grip sensor.

The controller 180 may execute a specific function based on the user input corresponding to the external force (S720).

If an external force is sensed by the grip sensor, the controller 180 may determine a user input corresponding to the external force, based on at least one of an intensity of the external force, a time when the external force is applied, the number of times that the external force is applied, and a position where the external force is applied. The intensity of the external force means a strength of the external force or a pressure (a force per unitary area).

The controller 180 may execute a function related to a user interface displayed on the touch screen 151, based on the user input corresponding to the external force. That is, the controller 180 may execute a different function according to a user interface.

More specifically, the controller 180 may determine different user inputs based on external forces having different intensities, and may execute different functions based on the different user inputs. For instance, if an external force having a first intensity is sensed, the controller 180 may execute a first function based on a first user input corresponding to the external force having the first intensity. As another example, if an external force having a second intensity is sensed, the controller 180 may execute a second function based on a second user input corresponding to the external force having the second intensity.

So far, has been explained an operation of the mobile terminal when an external force is sensed by the grip sensor.

Hereinafter, will be explained various embodiments related to such an operation of the mobile terminal.

Figure 8A:
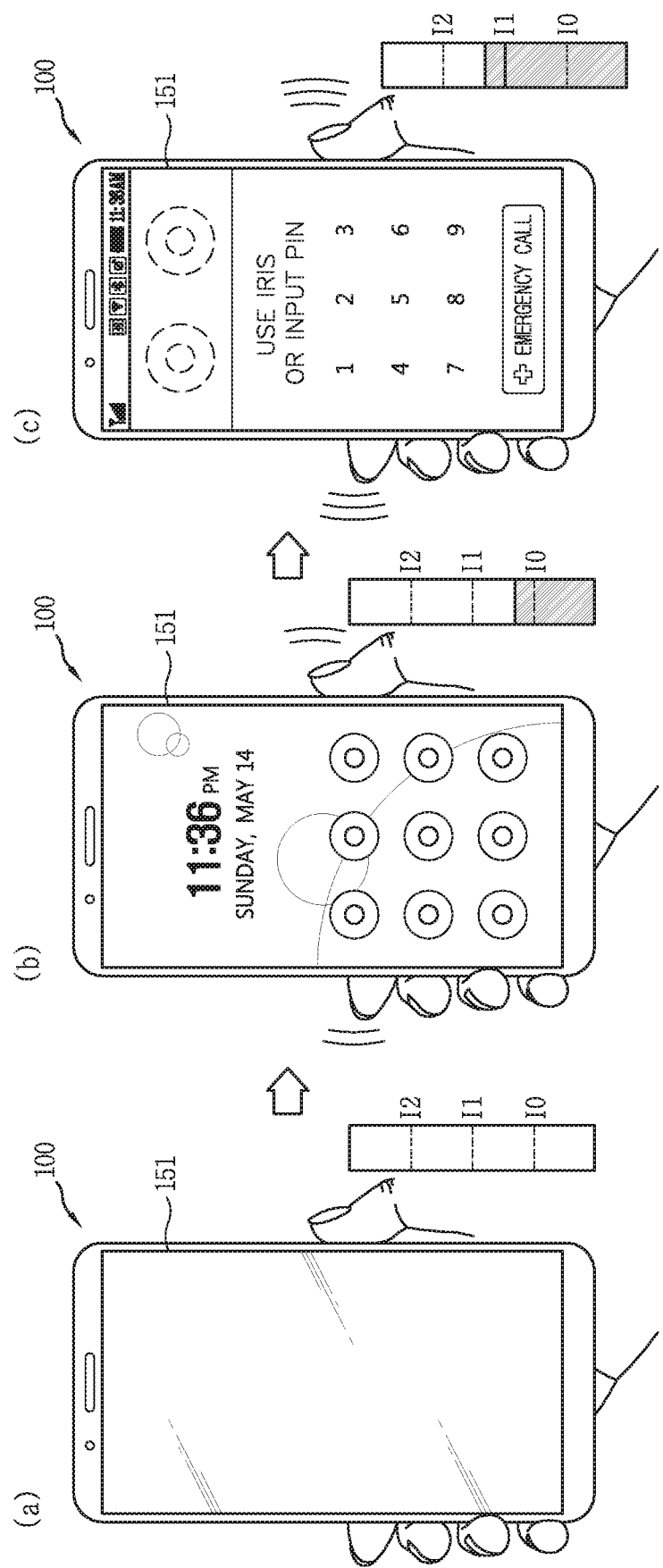
FIGS. 8A to 15B are conceptual views for explaining the operation method shown in FIG. 7.
Figure 8B:
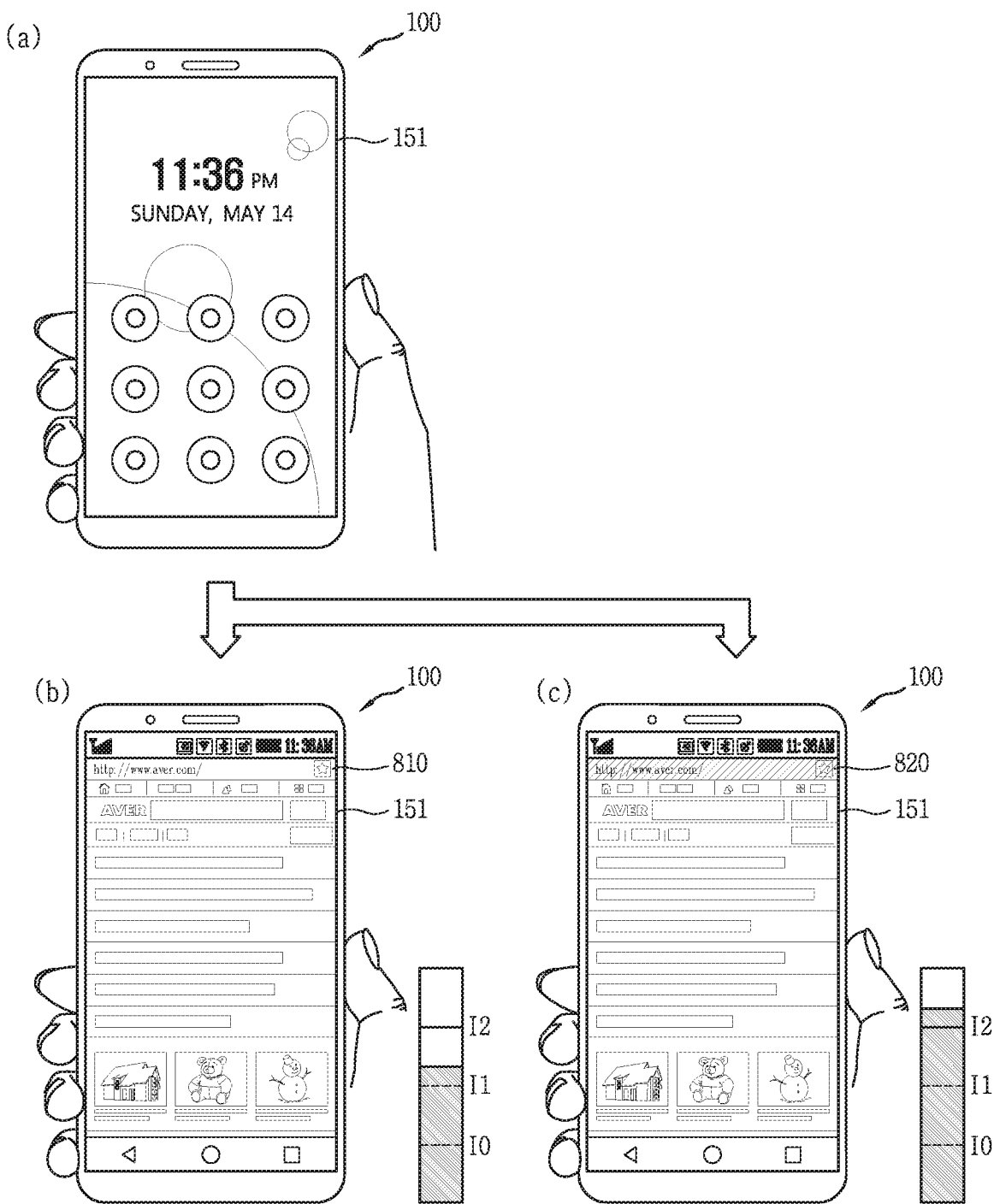

FIGS. 8A and 8B are conceptual views showing an embodiment to release a locked state by using a grip gesture.

Referring to FIG. 8A(a), the touch screen 151 may be in an off state of a lamp. In the off state of the touch screen 151, display of visual information may be limited.

Referring to FIG. 8A(b), if an external force is sensed, the controller 180 may convert the touch screen 151 into an on state of the lamp, based on a user input corresponding to the external force. The user input corresponding to the external force is an input corresponding to an external force having an intensity of I0~I1.

And the controller 180 may display a lock screen indicating a locked state, to the touch screen 151, based on the user input corresponding to the external force. The lock screen may include a password input screen to release the lock screen, brief summary information such as time and weather, etc.

The password input screen is a screen to input password information set by a user, and may be displayed only in a case where a password to release a locked state is set. That is, in a case where a password to release a locked state is not set, the lock screen may include only brief summary information such as time and weather, except for a password input screen. Whether to set a password to release a locked state or not may be selected by a user.

FIG. 8A(b) shows a lock screen in a set state of a password information. Such password information may be determined by a user. For instance, the password information may include not only digital information such as numerical information, pattern information, fingerprint information, iris information, and facial image information, but also bio-information. The password information may be stored in plurality.

The password information to release a locked state may be variable according to a user's selection. That is, the controller 180 may output a password input screen to input one of a plurality of password information for releasing a locked state, to a lock screen, based on a user's control command. Thus, the user may release a locked state by inputting password information required by a password input screen displayed on a lock screen.

For instance, as shown in FIG. 8A(c), if an external force having an intensity of I1~I2 is sensed in a displayed state of the lock screen, the controller 180 may perform an iris recognition function to release a locked state through an iris recognition. In this case, a password input screen to input iris information may be displayed on the touch screen 151. That is, a user may apply various user inputs to release a locked state to the mobile terminal, by controlling an intensity of a grip force with respect to the mobile terminal.

If password information to release a locked state is not set, the controller 180 may immediately enter a lock-released state by applying a preset user input without applying a password information input in a locked state. For instance, as shown in FIGS. 8B(a)~(c), the controller 180 may release a locked state based on a user input corresponding to an external force applied to side surfaces, and may display a lock-released screen on the touch screen 151.

The controller 180 may enter a different release mode according to an intensity of an external force. The release mode is a state of the mobile terminal that a locked state is released and the mobile terminal is controllable by a user input. The release mode may have a plurality of modes where different functions have been set. More specifically, the release mode may include a security mode where a history of functions executed in the mobile terminal does not remain (i), and a general mode where a history of functions executed in the mobile terminal remains (ii).

As shown in FIG. 8B(b), the controller 180 may enter a general mode based on a first user input corresponding to an external force having a first intensity. In the general mode, the controller 180 may store history information on access to web pages (URL information inputted to an address bar 810). Alternatively, as shown in FIG. 8B(c), the controller 180 may enter a security mode based on a second user input corresponding to an external force having a second intensity. In the security mode, the controller 180 may not store history information on access to web pages. In this case, the controller 180 may output an address bar 820 displayed on the touch screen 151 in gray, in order to inform a non-stored state of URL addresses inputted to the address bar 820. Thus, a user may operate the mobile terminal in a security mode when he or she does not wish to leave a usage history of the mobile terminal.

Although not shown, if an intensity of an external force applied to side surfaces of the body is more than a preset intensity in an off state of the touch screen 151, the controller 180 may release a locked state and may immediately perform a voice recognition function. The voice recognition function is a function to recognize a user's voice by utilizing an artificial intelligence, and to operate the mobile terminal based on the recognized voice. Thus, a user may control the mobile terminal without visually checking the mobile terminal, by applying an external force to side surfaces in a held state of the mobile terminal.

Figure 9A:
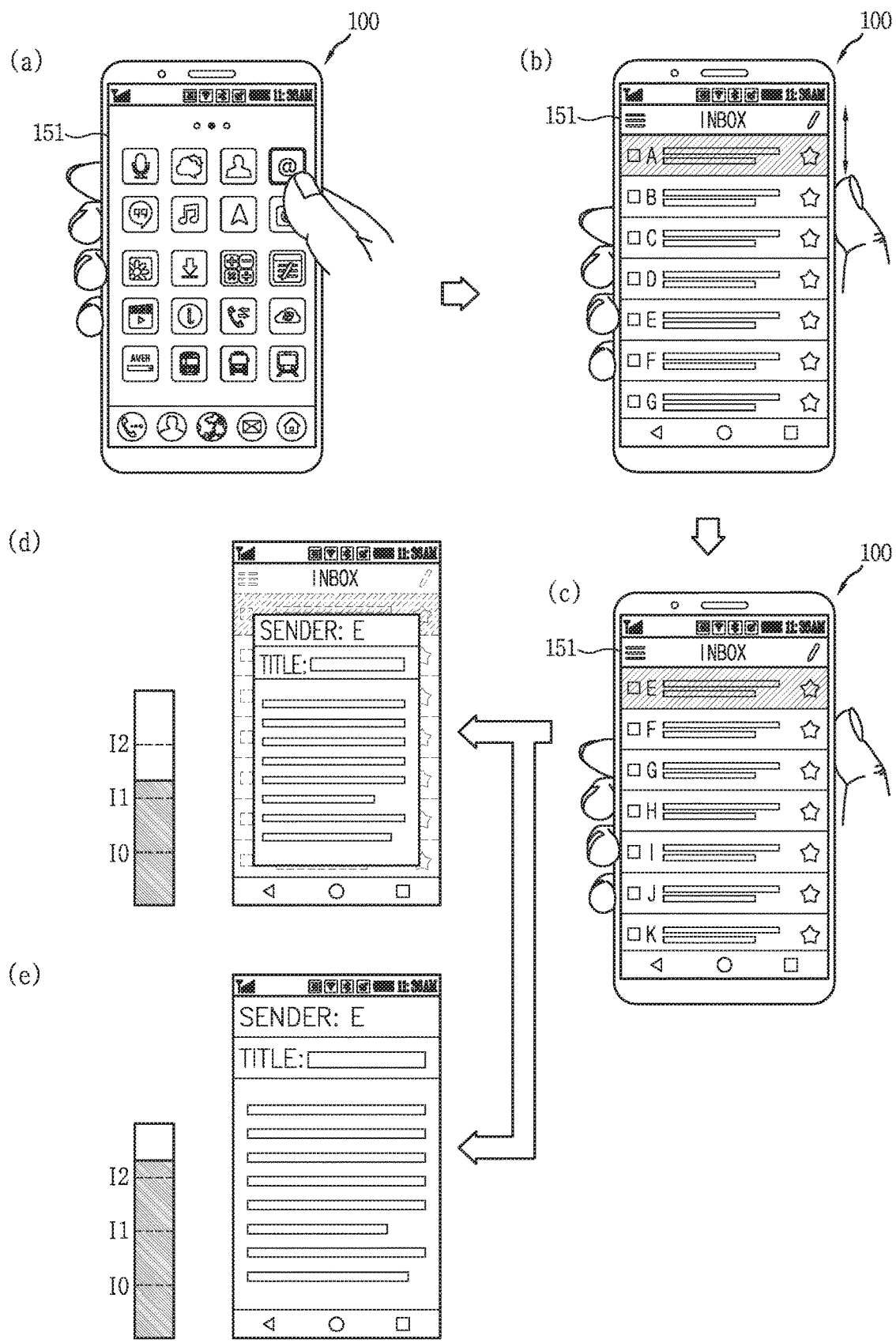
Figure 9B:
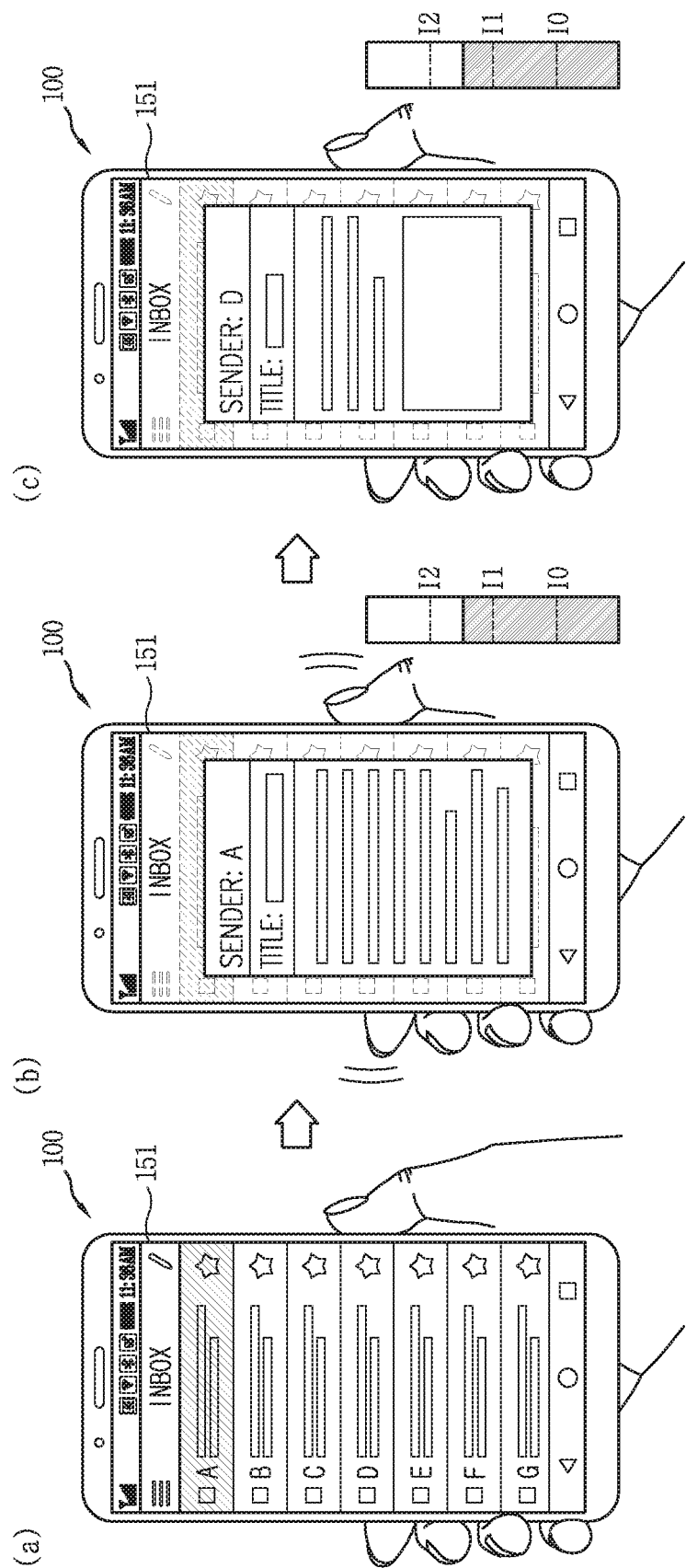
Figure 9C:
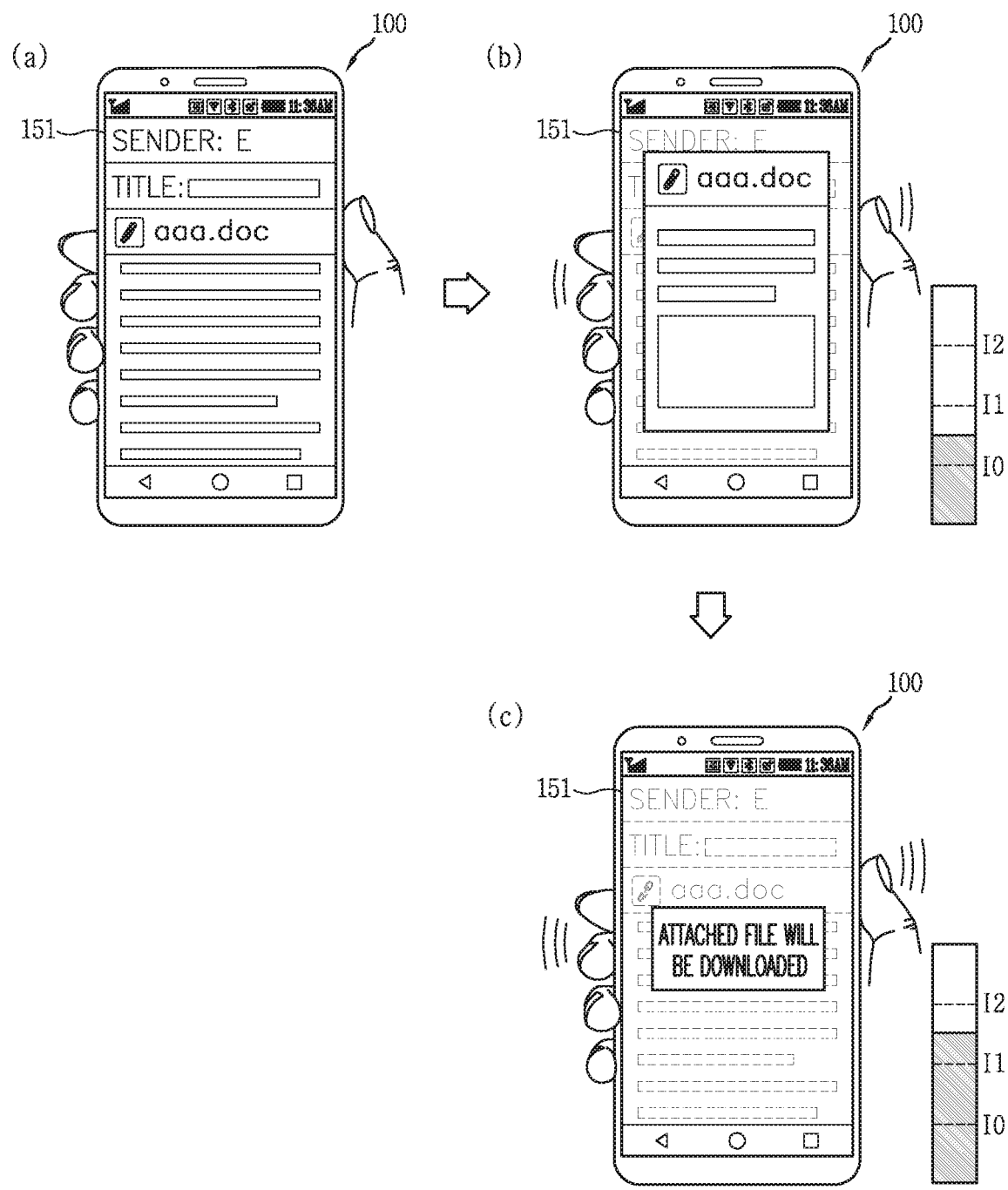

Hereinafter, will be explained a method for executing a message-related function based on a grip gesture. FIGS. 9A to 9C are conceptual views showing a method for executing a message-related function based on a grip gesture.

Referring to FIG. 9A, the controller 180 of the mobile terminal according to the present invention may check contents of messages based on a grip gesture. The messages may include mails, text messages, multimedia messages, social network service (SNS) messages, etc.

More specifically, referring to FIG. 9A(a), the controller 180 may execute a message application based on a touch input applied to a message icon. In this case, as shown in FIG. 9A(b), the controller 180 may output a list of messages stored in the mobile terminal to the touch screen. The output state of the list of messages may be called a first display screen state.

The controller 180 may set a message displayed on an uppermost region of the touch screen 151, among the messages included in the list, as a selectable one. In this case, the message displayed on the uppermost region of the touch screen 151 may be displayed in a visually-distinguishable manner from other messages.

As shown in FIG. 9B(c), the controller 180 may scroll the list of messages based on a drag input applied to a side surface. In this case, the message set as a selectable one may be changed. A user may apply an external force to side surfaces when a desired message has a state change into a selectable one.

As shown in FIG. 9A(d), if an external force having an intensity more than a preset value (I1) is applied, the controller 180 may display a content of the message set as a selectable one on a preview screen, based on a user input corresponding to the external force having the intensity more than the preset value (I1). Such a preview screen may be called an intermediate display state. The intermediate display state means an intermediate state between a first display state and a second display state. That is, the intermediate display state means an intermediate state before a first display state is converted into a second display state, and displays screen information which shows the second display state in advance.

As shown in FIG. 9A(e), if an external force having an intensity more than a preset value (I2) is applied before sensing of the external force is terminated, the controller 180 may display a content of the message set as a selectable one, based on a user input corresponding to the external force having the intensity more than the preset value (I2). Such a screen state where a content of a message has been output may be called a second display state. That is, the second display state indicates an execution screen where a specific function has been executed according to a user input.

On the other hand, if an external force having an intensity more than the preset value (I2) is not sensed before sensing of the external force is terminated, the controller 180 may execute a user interface in the first display state. That is, the controller 180 may re-output the screen information shown in FIG. 9A(b).

With such a configuration, a user may check an execution screen of a specific function in advance by controlling an intensity of an external force, before the specific function is executed. Then, the user may determine whether to execute the specific function or not. Thus, a user may determine whether to execute a specific function without executing the specific function.

Further, the controller 180 may sequentially display contents of messages in a preview state. For instance, referring to FIGS. 9B(a) and (b), the controller 180 may display a content of a specific message on a preview screen, based on a user input corresponding to an external force having an intensity more than I1. As shown in FIG. 9B(c), in the displayed state of the content of the specific message on the preview screen, if a user input corresponding to an external force having an intensity more than I1 is applied again, the controller 180 may display a content of another message rather than the specific message, on the preview screen. The another message is set to be displayed after the specific message, and may be received immediately before or after the specific message is received.

Referring to FIG. 9C, the controller 180 may execute an attached file download function based on a user input corresponding to an external force having an intensity more than I2. More specifically, as shown in FIGS. 9C(a) and (b), the controller 180 may display a content of a specific message on a preview screen, based on a user input corresponding to an external force having an intensity more than I2. As shown in FIG. 9C(c), in the displayed state of the content of the specific message on the preview screen, if an external force having an intensity more than I2 is applied, the controller 180 may download an attached file attached to the specific message. That is, in the present invention, a different function may be executed according to an application time of an external force having an intensity more than a specific value. So far, has been explained a method for executing a message-related function based on a user input corresponding to an external force applied to side surfaces.

Figure 9D:
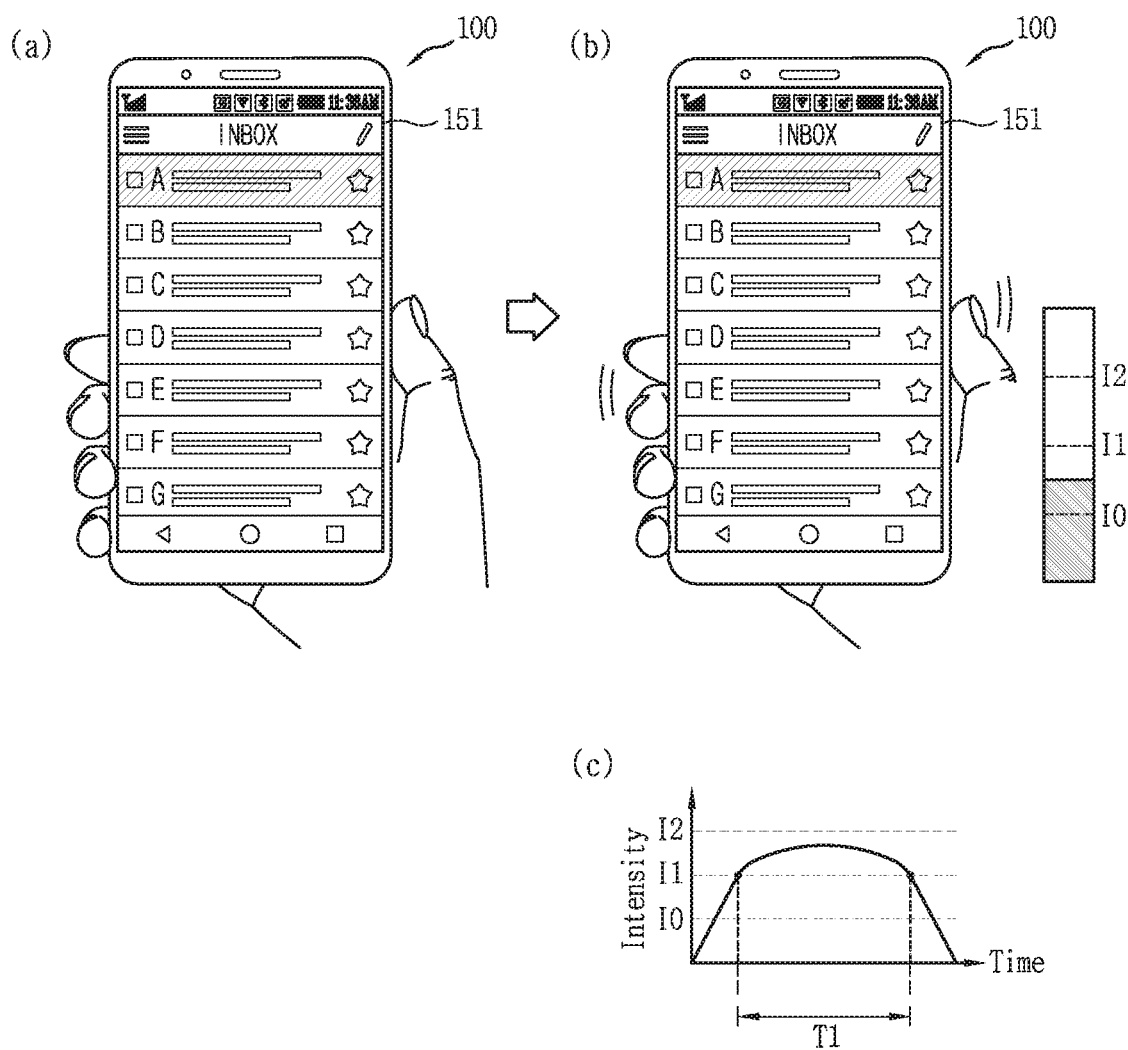

Referring to FIG. 9D, the controller 180 may display a home screen page on the touch screen 151, if an external force having an intensity more than I2 is applied for more than a preset time, in a displayed state of an execution screen of a mail application on the touch screen 151. In this case, the mail application may be executed in a background.

The home screen page is screen information indicating a standby state, and is a screen including icons or widgets of applications installed in the mobile terminal. The home screen page may be called a menu page, a standby screen, an Apps page, etc.

Although not shown, the controller 180 may display an app list of recently-executed applications, rather than the home screen page, if an external force having an intensity more than I2 is applied for more than a preset time, in a displayed state of an execution screen of a mail application on the touch screen 151. The app list of recently-executed applications is a list of applications having an execution history based on a current time. With such a configuration, in the present invention, a function of a home button may be executed through a grip gesture, even if the home button is not additionally provided.

Hereinafter, will be explained a method for executing a video-related function through a user input corresponding to an external force applied to side surfaces. FIGS. 10A to 10F are conceptual views showing embodiments of a video-related function through a user input corresponding to an external force applied to side surfaces.

Figure 10A:
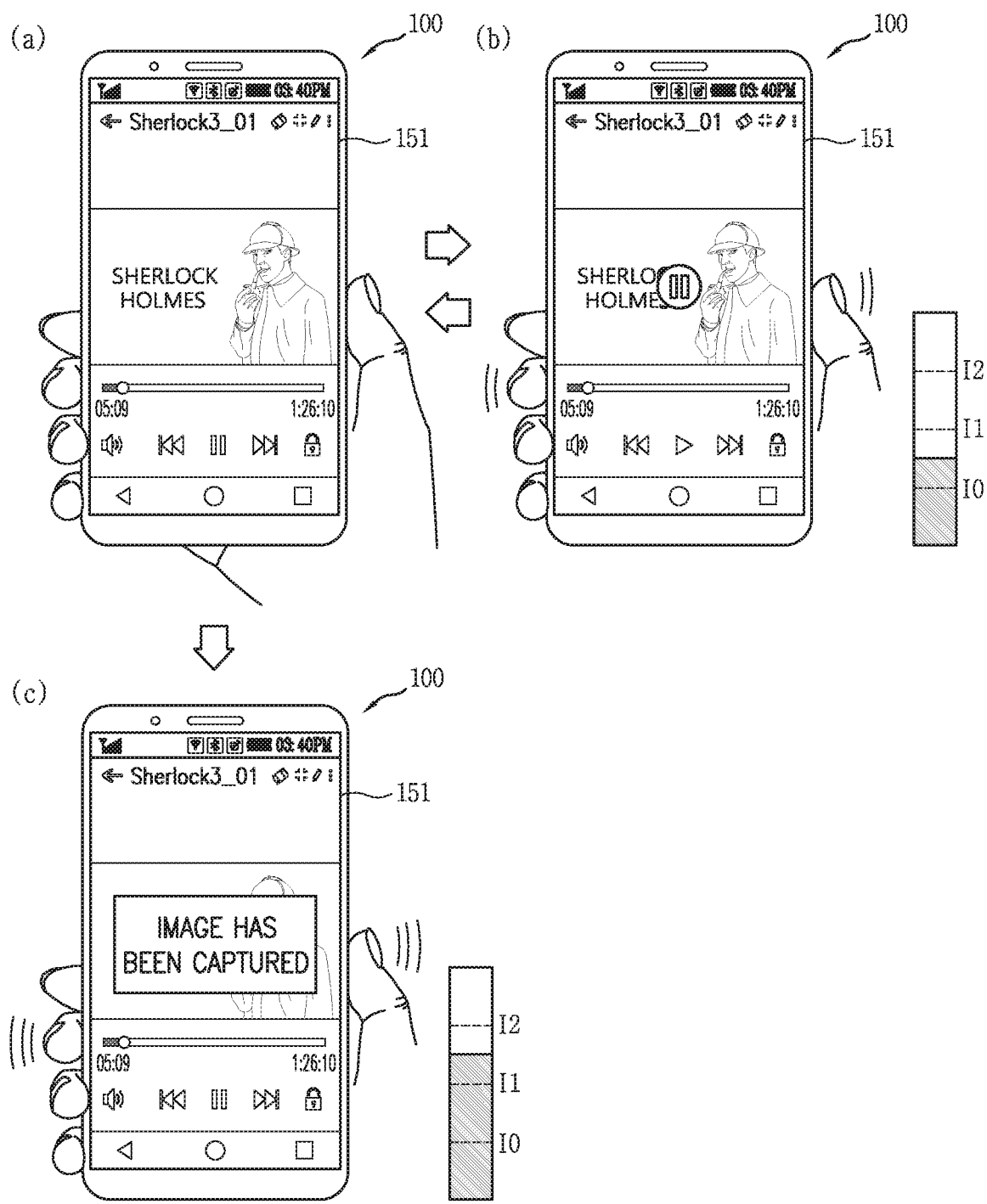

Referring to FIG. 10A(a), the controller 180 may output a video play screen to the touch screen based on a user's control command. The video may be stored in an external server to be played in a streamlining manner, or may be stored in the memory 170.

Referring to FIG. 10A(b), if a user input corresponding to an external force having an intensity more than I0 is applied while a video is played, the controller 180 may stop playing the video. If a user input corresponding to an external force having an intensity more than I0 is applied when the video play is stopped, the controller 180 may re-play the video from the play stop time.

Referring to FIG. 10A(c), the controller 180 may execute a screen capture function with respect to the video, based on a user input corresponding to an external force having an intensity more than I1. Here, the captured image is an image output to the touch screen 151 at a play time corresponding to a time when the user input has been applied. Thus, a user may conveniently store a specific scene as an image file while viewing a video.

Figure 10B:
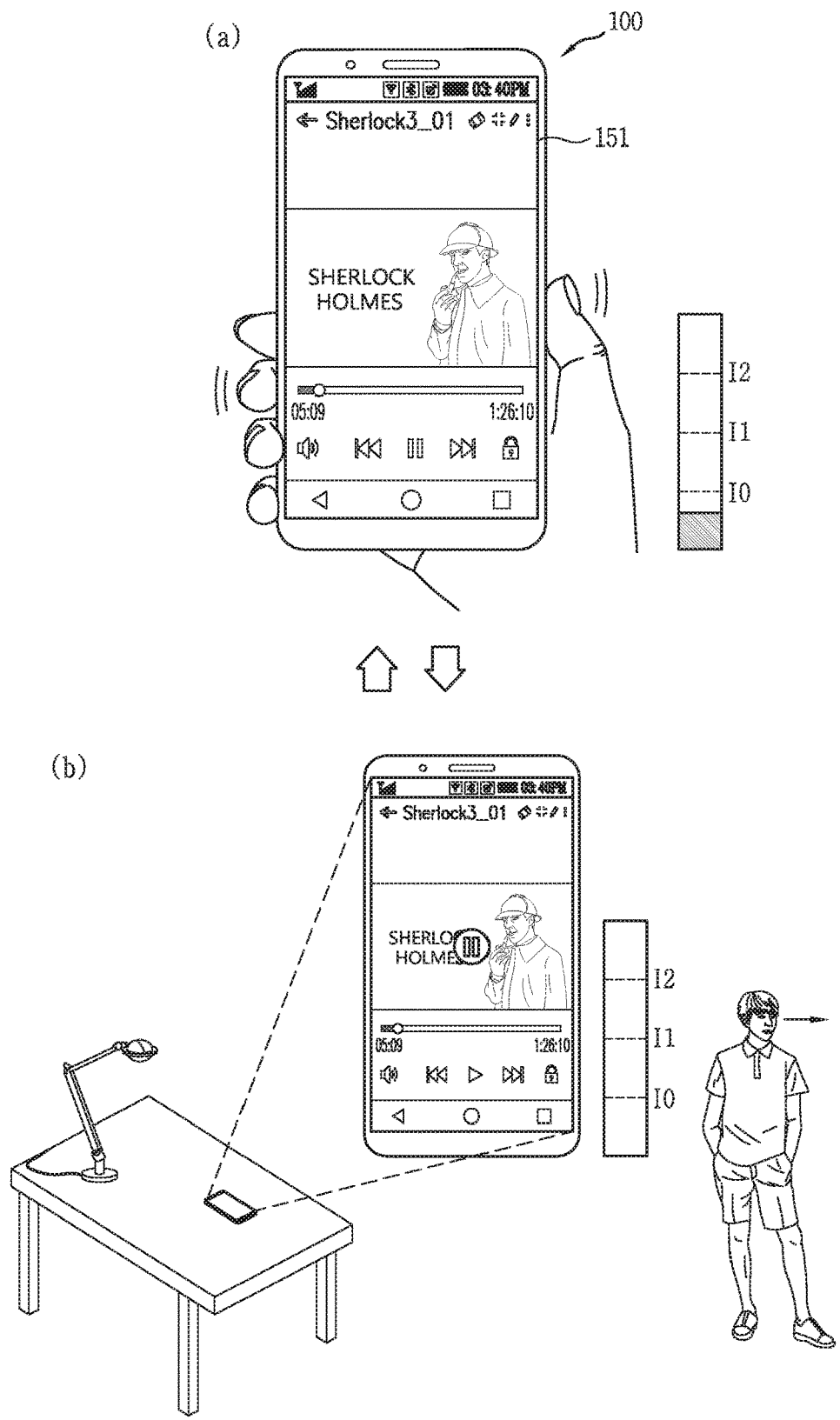

As shown in FIG. 10B(a), the controller 180 may play a video if an external force having an intensity less than I0 is applied to side surfaces of the body. As shown in FIG. 10B(b), if an external force applied to the side surfaces of the body with an intensity less than I0 is not sensed while a video is played, the controller 180 may determine that a user is not viewing the video, and may stop the video play. Thus, in the present invention, if a user stops viewing a video, playing the video may be automatically stopped without an additional control command.

The controller 180 may sense external forces having different intensities and applied to both side surfaces of the body. In this case, the controller 180 may execute a video-related function on the basis of a position where an external force having a higher intensity is sensed.

Figure 10C:
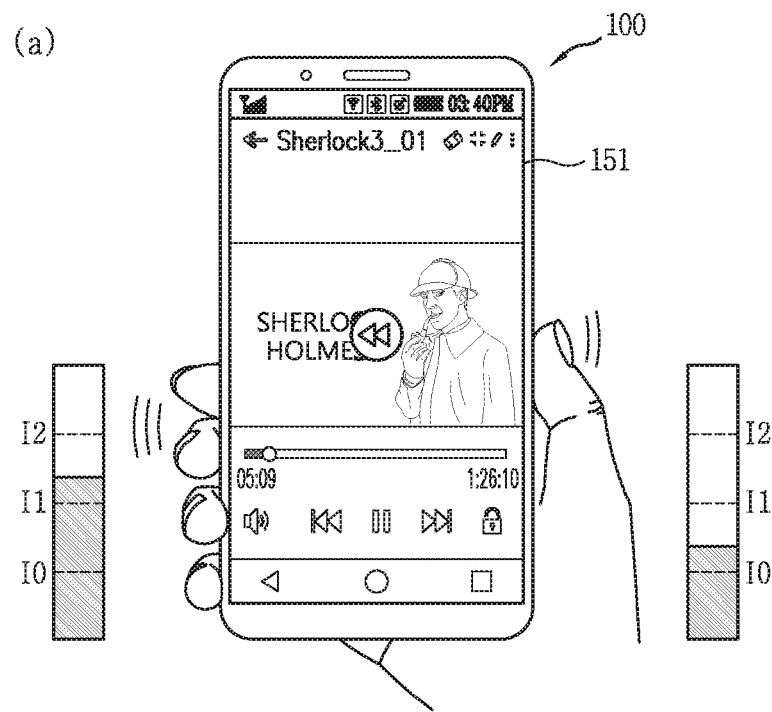
Figure 10C:
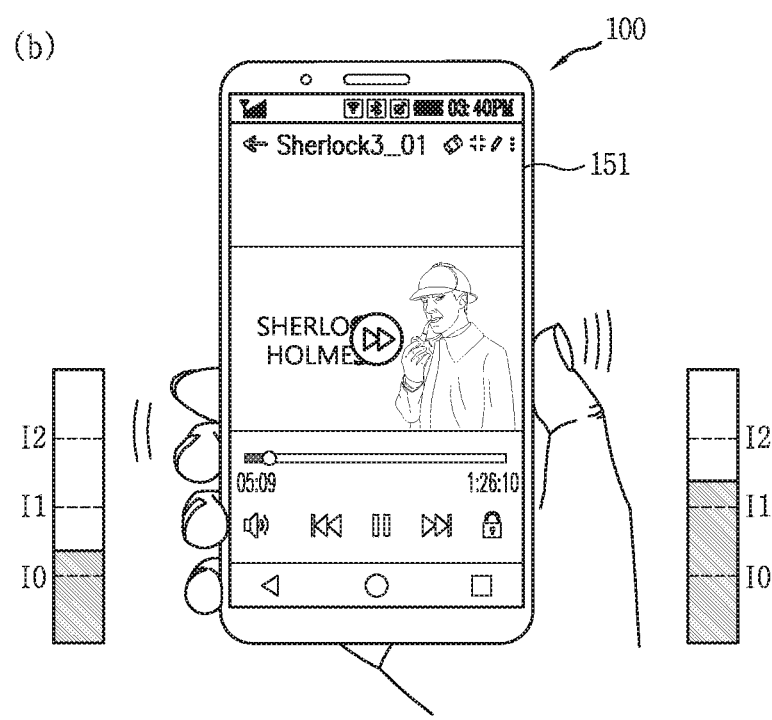

For instance, as shown in FIG. 10C(a), the controller 180 may sense an external force having a higher intensity, on a left side surface of the body on the basis of a front surface of the touch screen 151. In this case, the controller 180 may execute a rewinding function of a video. The rewinding function is a function to change a play time of a video to a previous play time earlier than a current play time.

As another example, as shown in FIG. 10C(b), the controller 180 may sense an external force having a higher intensity, on a right side surface of the body on the basis of the front surface of the touch screen 151. In this case, the controller 180 may execute a fast-forward function of a video. The fast-forward function is a function to change a play time of a video to a subsequent play time later than a current play time.

The controller 180 may execute a different function based on a posture of the mobile terminal and a user input corresponding to an external force. The posture of the mobile terminal may include a first posture (or a vertical posture) that a lengthwise direction of the mobile terminal is parallel to a gravitational direction, and a second posture (or a horizontal posture) that the lengthwise direction of the mobile terminal is perpendicular to the gravitational direction.

Figure 10D:
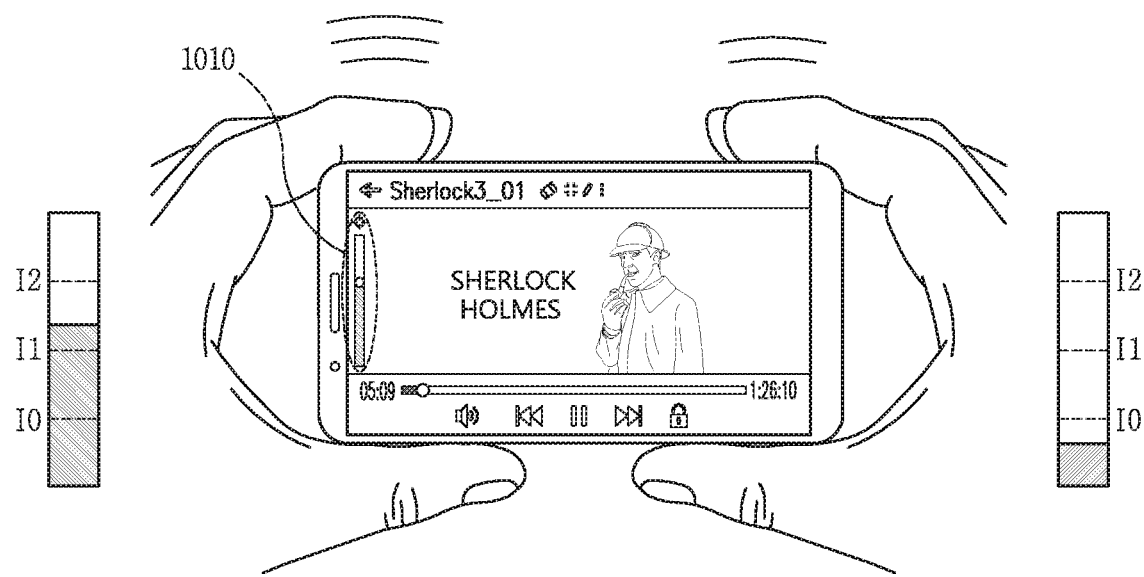
Figure 10E:
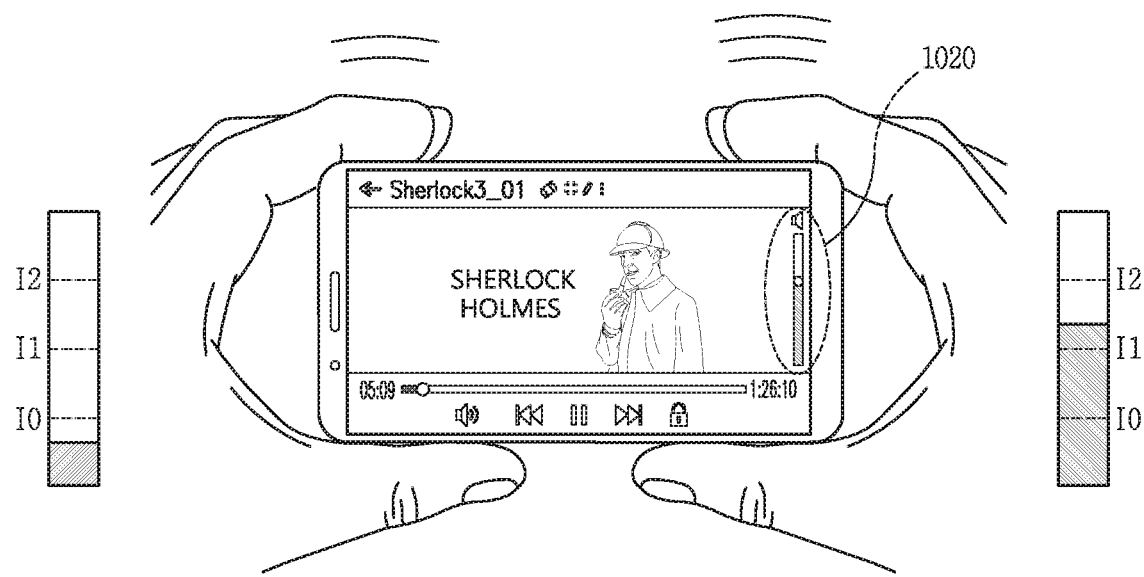

FIG. 10C shows a method for executing a different function when different external forces are applied to both side surfaces of the body in a vertical posture of the mobile terminal. FIGS. 10D and 10E show a method for executing a different function when different external forces are applied to both side surfaces of the body in a horizontal posture of the mobile terminal.

Referring to FIG. 10D, in a horizontal posture of the mobile terminal, the controller 180 may sense an external force having a higher intensity, on a left side surface of the body on the basis of the front surface of the touch screen 151. In this case, the controller 180 may control an output brightness of a video. That is, as shown in FIG. 10D, the controller 180 may output a graphic object 1010 related to a brightness control if an external force having a higher intensity is sensed on a left side surface of the body, and may control a brightness according to the intensity of the external force. The controller 180 may control a brightness of the touch screen to be higher when an external force has a higher intensity. For instance, if a sensed intensity of an external force is a first intensity, the controller 180 may control the touch screen to have a brightness corresponding to the first intensity. On the other hand, if a sensed intensity of an external force is a second intensity higher than the first intensity, the controller 180 may control the touch screen to have a brightness corresponding to the second intensity.

As another example, referring to FIG. 10E, in a horizontal posture of the mobile terminal, the controller 180 may sense an external force having a higher intensity, on a right side surface of the body on the basis of the front surface of the touch screen 151. In this case, the controller 180 may control a volume level of a video. More specifically, as shown in FIG. 10E, if an external force having a higher intensity is sensed on a right side surface of the body, the controller 180 may output a graphic object 1020 related to a volume control. The controller 180 may control a volume level according to the sensed intensity of the external force. The controller 180 may control a volume level to be higher when an intensity of an external force is higher. For instance, if a sensed intensity of an external force is a first intensity, the controller 180 may output a sound at a level corresponding to the first intensity. On the other hand, if the sensed intensity of the external force is a second intensity higher than the first intensity, the controller 180 may output a sound at a level corresponding to the second intensity.

Figure 10F:
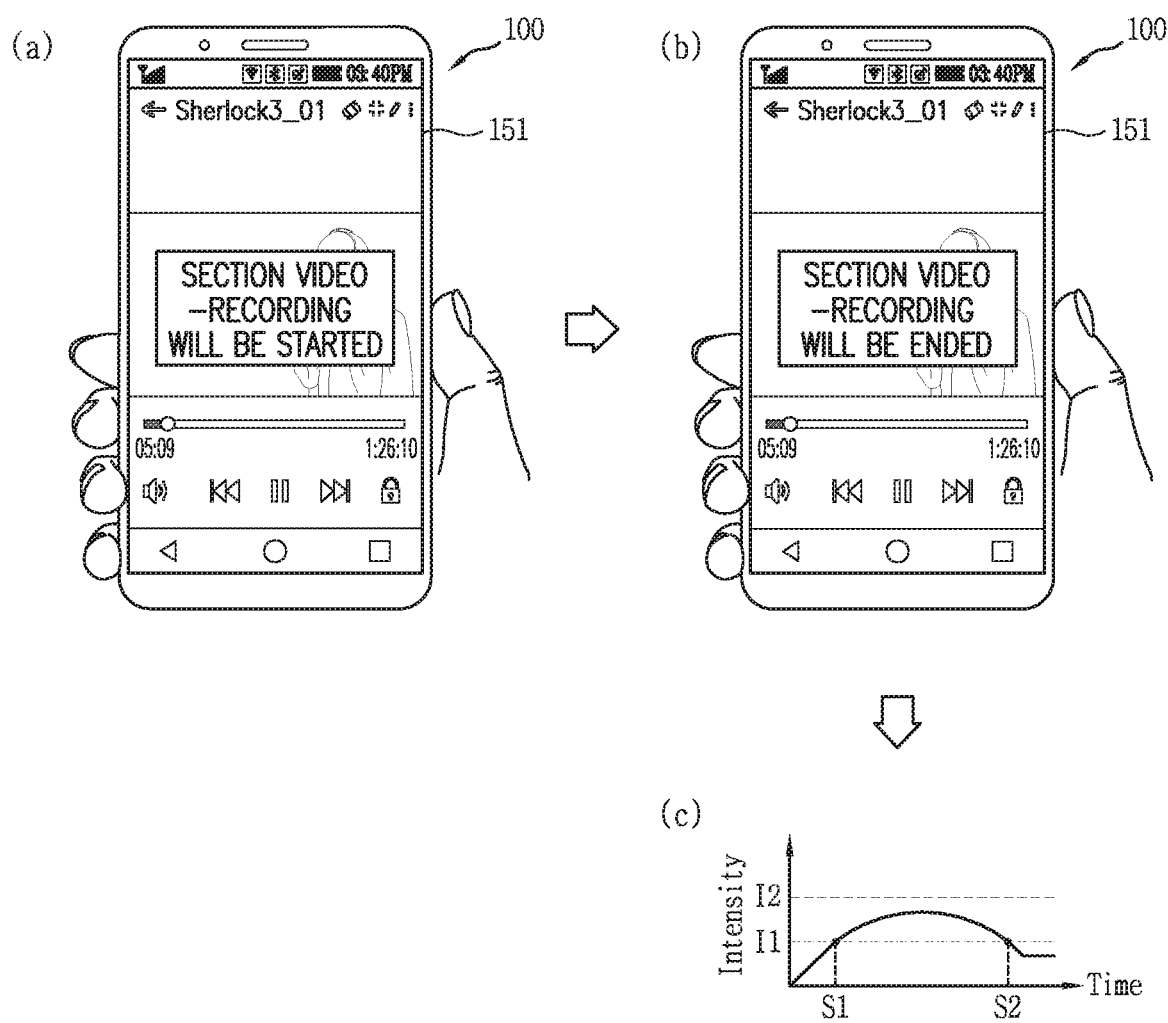

Referring to FIG. 10F, the controller 180 may generate a partial video if an external force having a specific intensity is applied for more than a preset time while a video is played. More specifically, as shown in FIG. 10F(c), the controller 180 may apply an external force having an intensity more than I1 between S1 and S2 indicating times. In this case, as shown in FIG. 10A(a), the controller 180 may output a pop-up window indicating that a partial video is being generated, at S1. And as shown in FIG. 10A(b), the controller 180 may output a pop-up window indicating that the generation of the partial video has ended, at S2. Thus, the controller 180 may generate a partial video corresponding to a time between S1 and S2. With such a configuration, a user may conveniently generate a partial video while a video is played.

Figure 11A:
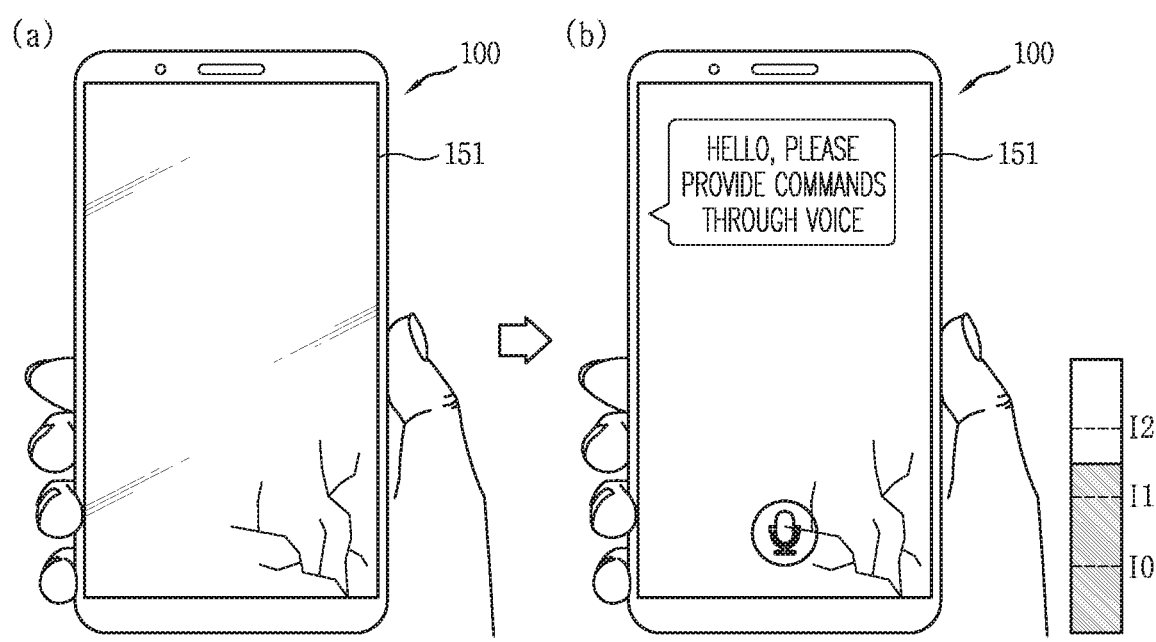
Figure 11B:
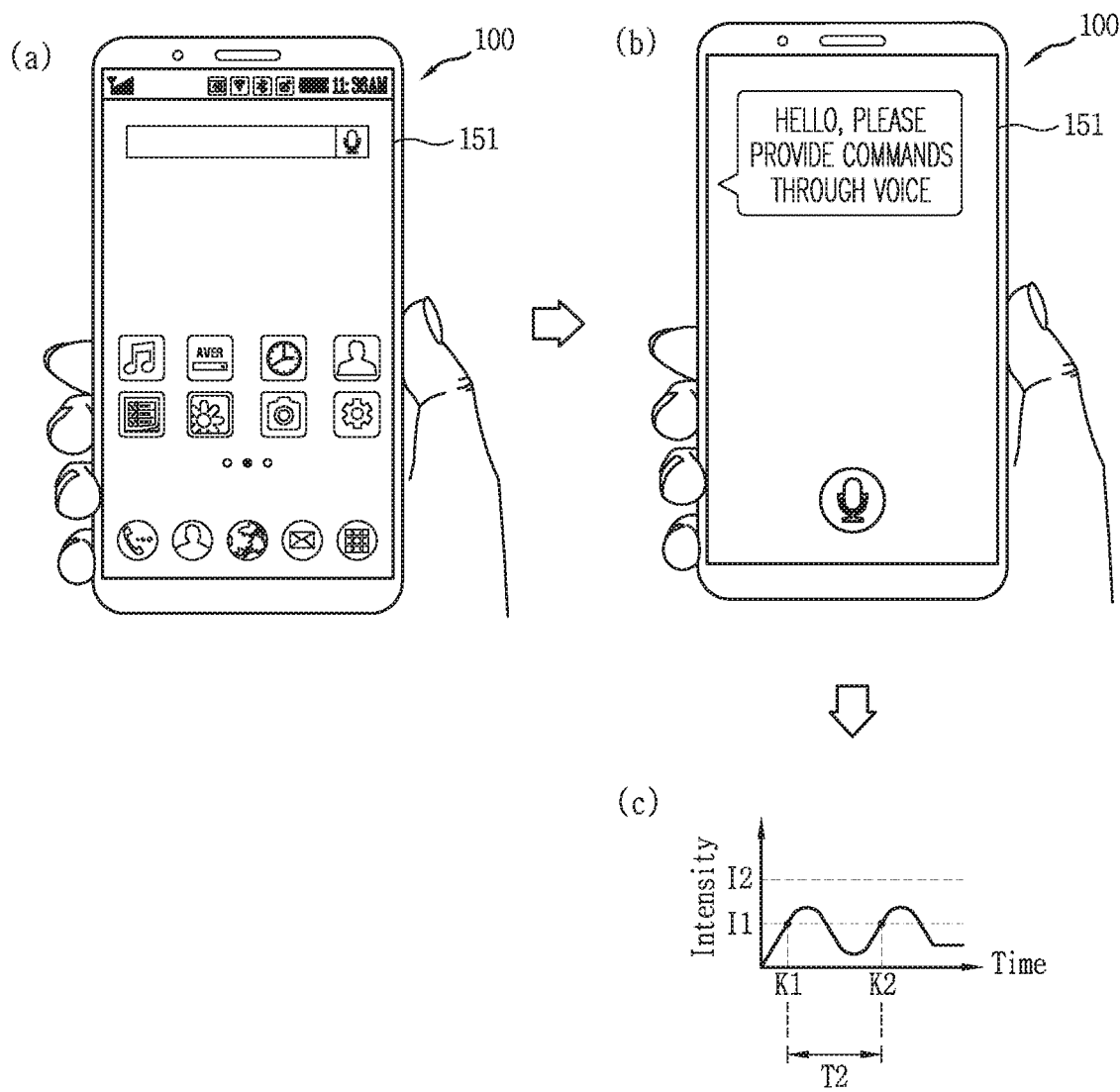

Hereinafter, will be explained a method for executing a voice recognition function using an external force applied to side surfaces when the touch screen has a breakdown. FIGS. 11A and 11B are conceptual views showing embodiments to execute a voice recognition function.

As shown in FIG. 11A(a), when a malfunction of the touch screen 151 is sensed, the controller 180 may execute a voice recognition function such that the mobile terminal may be operated through a voice. The malfunction of the touch screen 151 may be a malfunction of a part of the touch sensor, a damage of a liquid crystal display unit of the touch screen or a part of a window of the touch screen, etc.

As shown in FIG. 11B, if an external force having an intensity more than I1 is applied to side surfaces in a breakdown state of the touch screen, the controller 180 may execute a voice recognition function. Thus, in the present invention, the mobile terminal may be controlled through a voice rather than a touch input. Once the voice recognition function is executed, the controller 180 may output notification information indicating that the voice recognition function is being executed, to a normal region of the touch screen 151 except for a breakdown region. Thus, a user may be induced to input a voice such that the mobile terminal may be controlled through the voice.

As shown in FIGS. 11B(a) and (b), the controller 180 may execute a voice recognition function based on a user input corresponding to an external force applied to side surfaces, in an output state of a home screen page to the touch screen 151. In this case, as shown in FIG. 11B(c), the user input corresponding to an external force applied to side surfaces is an input consecutively applied two times within a predetermined time (T2) and corresponding to an external force having more than a specific intensity. That is, the user input may be a double grip gesture. Alternatively, a voice recognition function may be executable through a long grip gesture, etc., which may be determined by a user's selection.

Figure 12A:
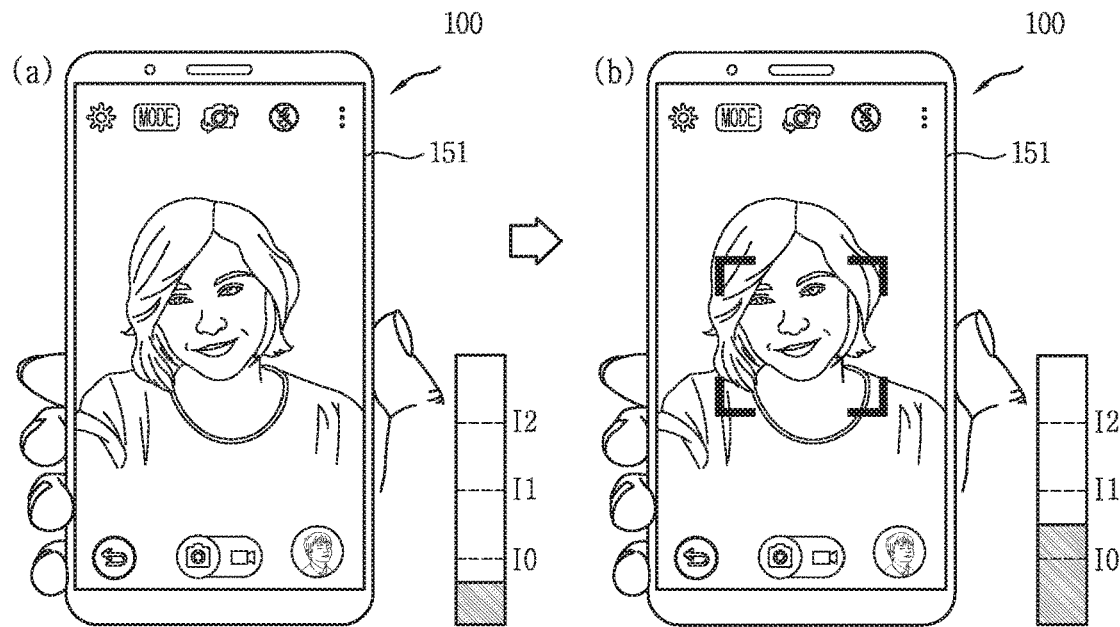
Figure 12A:
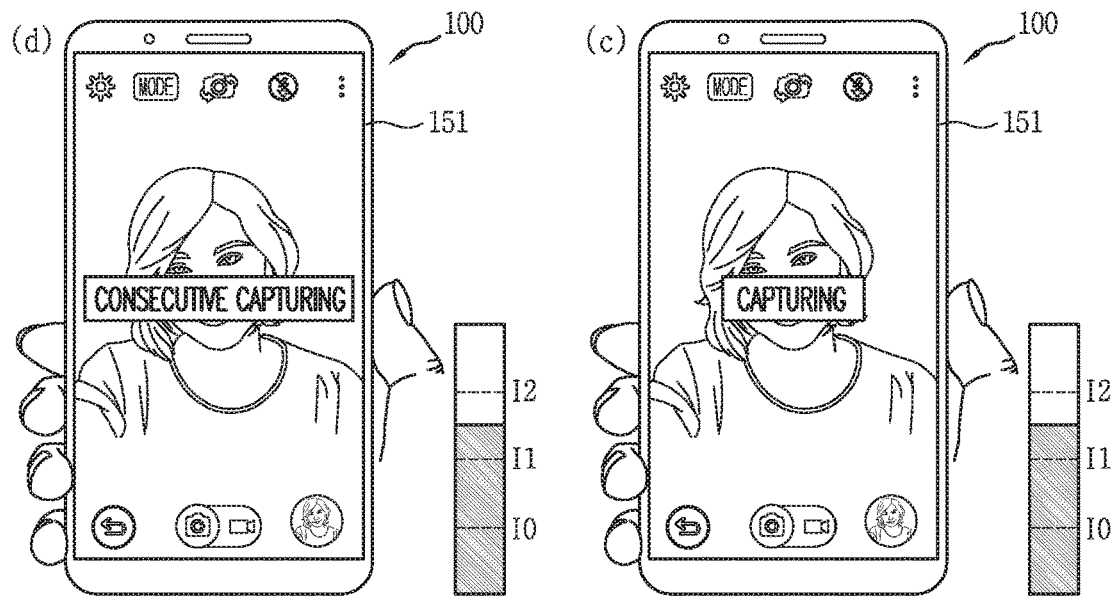
Figure 12A:
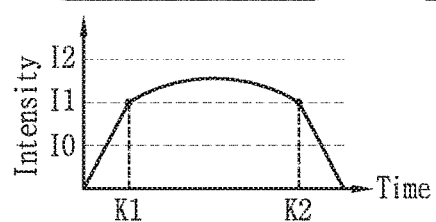
Figure 12B:
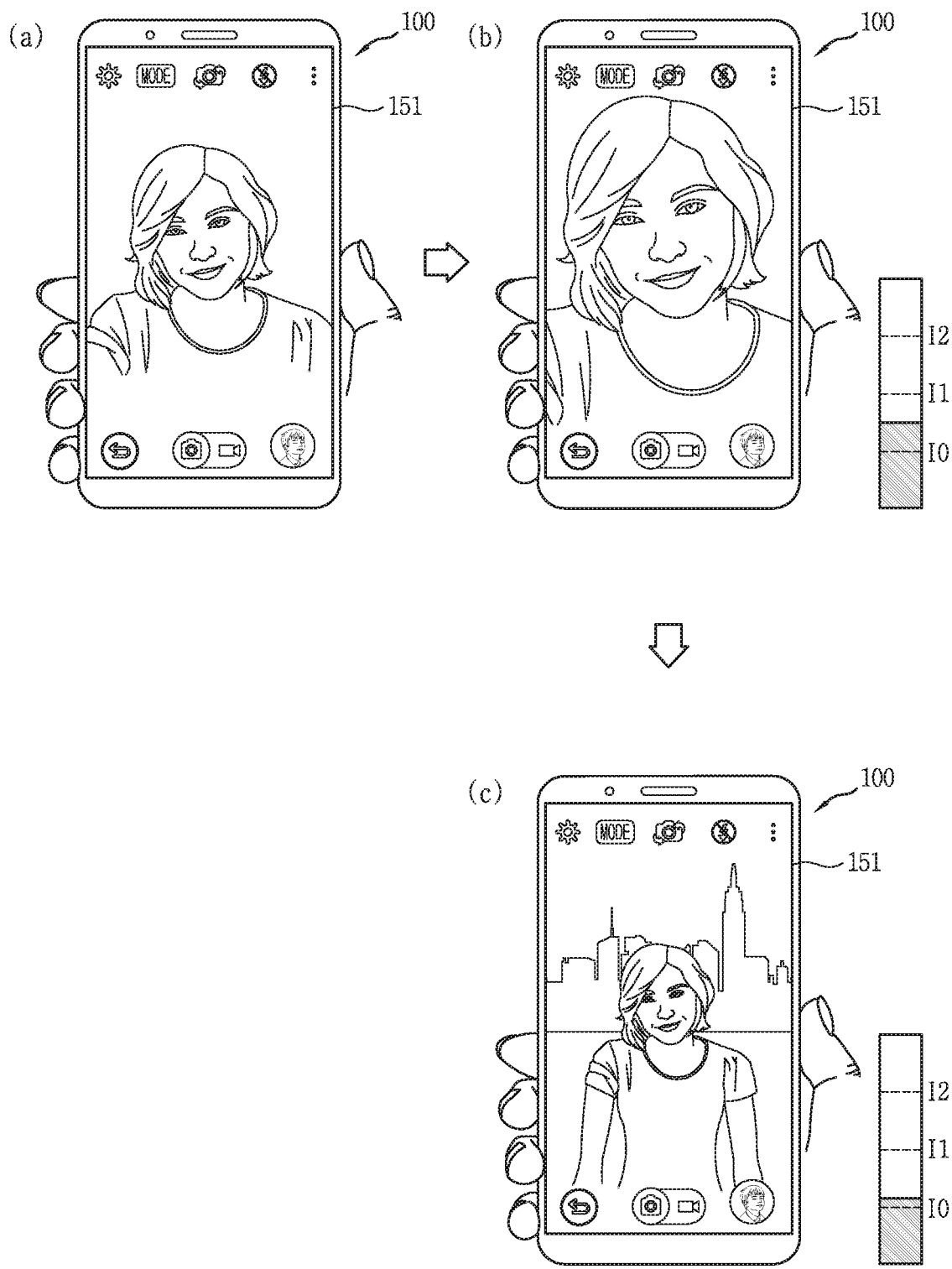

Hereinafter, will be explained a method for executing a camera function based on an external force applied to side surfaces of the body. FIGS. 12A and 12B are conceptual views showing a method for controlling a camera-related function based on an external force applied to side surfaces of the body while a camera function is executed.

The controller 180 may execute a camera application according to a user's request. In this case, as shown in FIG. 12A(a), a preview image received through the camera 121 may be displayed on the touch screen 151. As shown in FIG. 12A(b), if an external force applied to side surfaces of the body has an intensity more than 10, the controller 180 may reset a focal position such that a focal point of the camera 121 may be positioned on a subject.

As shown in FIG. 12A(c), the controller 180 may execute an image capturing function based on an external force having an intensity more than I1. As shown in FIG. 12A(d), the controller 180 may execute a consecutive capturing function which consecutively captures a plurality of images, if an external force having an intensity more than I1 is applied for more than a preset time (K1-K2). That is, the controller 180 may execute various functions related to the camera according to a size of an external force applied to side surfaces in an activated state of a camera function, and according to a time.

Although not shown, the controller 180 may execute a live photo function if an external force having an intensity more than I1 is applied for more than a preset time (K1-K2). The live photo function is a capturing function to store a video captured at a background for a predetermined time before and after a still image capturing time, together with a still image. If a user's control command is applied (e.g., a touch input is applied to a still image captured as a live photo), a video stored together with the still image may be played.

The controller 180 may execute a live photo function if an external force having an intensity more than I1 is applied for more than a preset time (K1-K2). In this case, the controller 180 may capture a video at a background while an external force having a first intensity is applied. Further, if an external force having an intensity more than I2 is newly applied while a video is captured at a background, the controller 180 may capture a still image, and may store the still image together with the video being captured at the background.

As shown in FIG. 12B, the controller 180 may execute a zoom in/out function based on an external force applied to side surfaces of the body. In this case, the aforementioned focalizing function may not be executed. More specifically, referring to FIGS. 12B(b) and (c), the controller 180 may execute a zoom in function or a zoom out function according to an intensity of an external force. With such a configuration, a user may execute a zoom in/out function with obtaining a view of a front surface of the touch screen 151.

Hereinafter, will be explained a method for executing a web page-related control based on a touch input applied to a side surface of the body.

Figure 13:
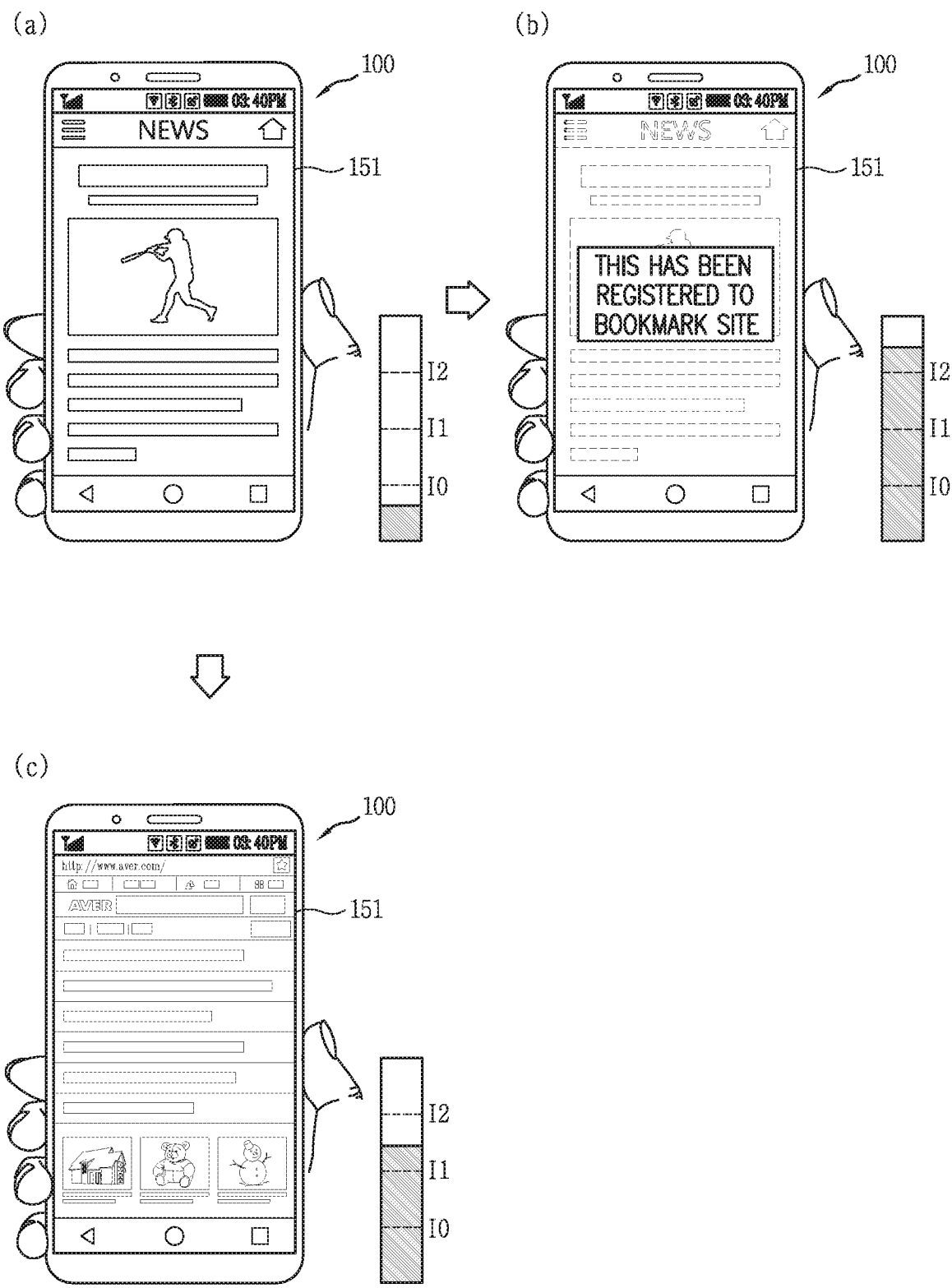

Referring to FIG. 13(*a*), the controller 180 may output a web page to the touch screen 151 based on a user's control command. The controller 180 may execute a different function related to a web page based on an intensity of an external force applied to side surfaces of the body.

For instance, as shown in FIG. 13(b), if an external force having an intensity more than I2 is applied, the controller 180 may store a URL address of a web page output to the touch screen 151 as a bookmark site. As shown in FIG. 13(c), if an external force having an intensity more than I1 is applied, the controller 180 may access a URL address set as a basic URL.

Figure 14:
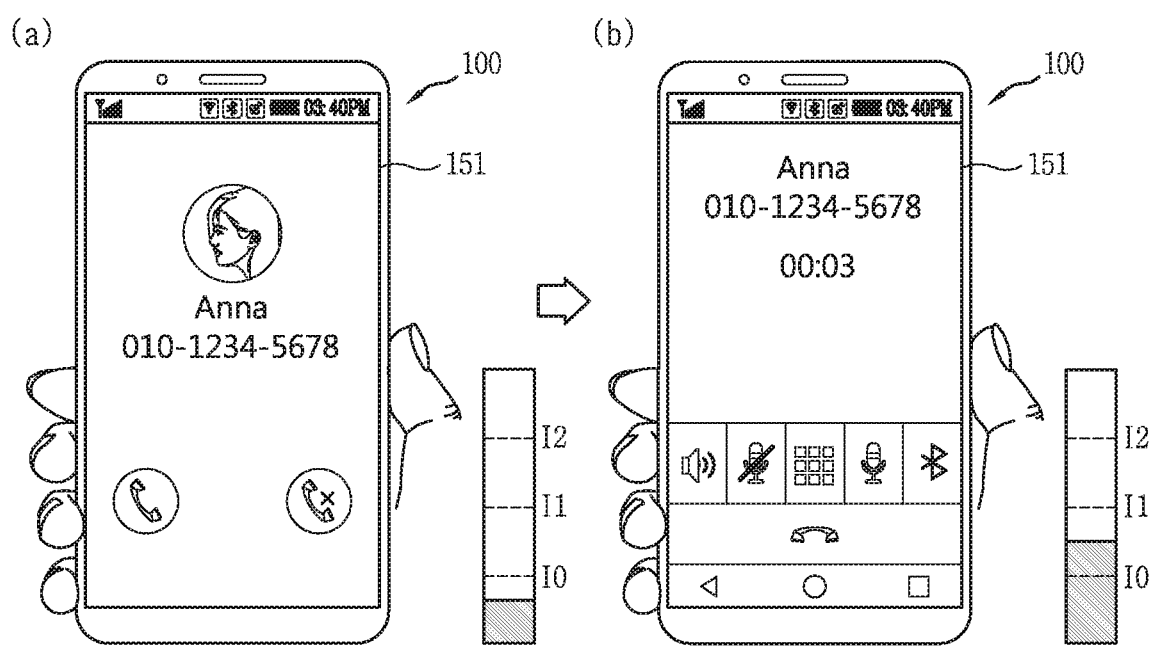

Hereinafter, will be explained a method for executing a call function based on a user input corresponding to an external force applied to side surfaces of the body. FIG. 14 is a conceptual view showing an embodiment to execute a call function based on a user input corresponding to an external force applied to side surfaces of the body.

Referring to FIG. 14(a), if a call signal is received from an external terminal, the controller 180 may output screen information indicating the reception of the call signal, to the touch screen 151. As shown in FIG. 14(b), the controller 180 may execute a call function to perform a call with the external terminal which has sent the call signal, if an external force having an intensity more than I0 is applied to side surfaces of the body while the call signal is received. That is, a user may easily perform a call by merely holding the mobile terminal.

Although not shown, the controller 180 may output notification information in at least one of tactile and audible manners, while the call signal is received. Here, if an external force having an intensity more than I2 is applied to side surfaces of the body, the controller 180 may control the notification information indicating that the call signal is being received, not to be output any longer. Thus, a user may not check undesired notification information any more.

Figure 15A:
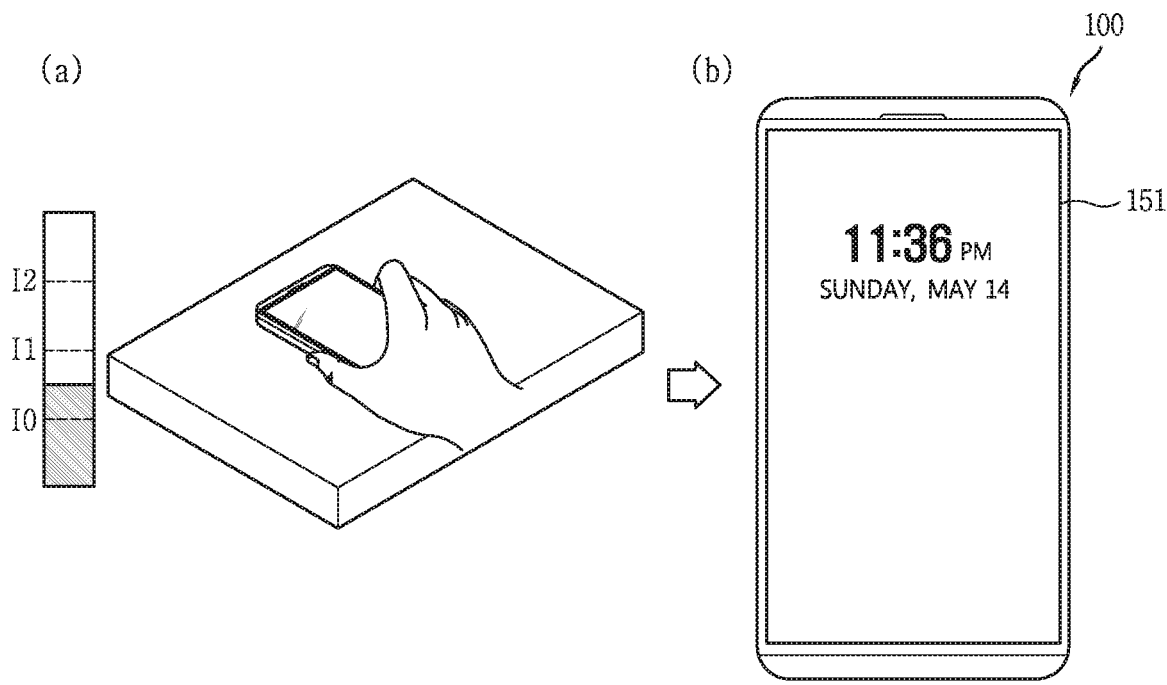
Figure 15B:
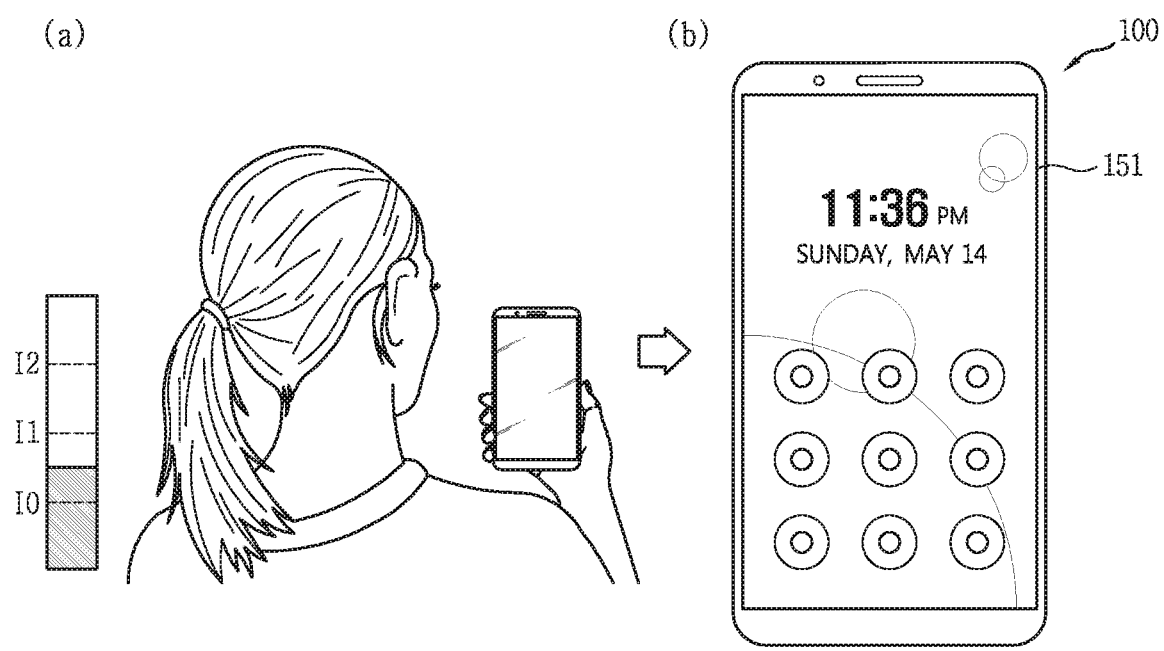

Hereinafter, will be explained a method for controlling an always on display function using an external force applied to side surfaces of the body. FIGS. 15A and 15B are conceptual views showing a method for controlling an always on display function using an external force applied to side surfaces of the body.

The mobile terminal according to the present invention may include a proximity sensor for sensing a user's palm positioned near a front surface of the body. The proximity sensor may sense whether a user's palm is positioned on a front surface of the touch screen 151. Thus, the controller 180 may determine whether a user's palm is positioned on a front surface of the body or a rear surface of the body.

The controller 180 may execute an always on display function if an external force applied to side surfaces of the body is sensed through a grip sensor, in a state that a user's palm is positioned on a front surface of the body. The always on display function is a function to set the touch screen to an intermediate state by driving the touch screen at a low power, such that specific information (e.g., time information) may be displayed on one region of the touch screen. The intermediate state indicates a state between an on state that a lamp of the touch screen 151 is turned on and an off state that the lamp of the touch screen 151 is turned off. Thus, the always on display function may reduce power consumption of the touch screen by displaying time or weather information frequently checked by a user, without entirely driving the touch screen.

The controller 180 may execute the always on display function based on a user input sensed through the grip sensor.

More specifically, referring to FIG. 15A(a), the controller 180 may determine that the mobile terminal is positioned on a holder which can hold the mobile terminal such as a table, if it is sensed through the proximity sensor that a user's palm is positioned on a front surface of the touch screen 151 in an off state of the touch screen 151. In this state, the controller 180 may execute an always on display function based on a grip gesture sensed through the grip sensor. As shown in FIG. 15A(b), the controller 180 may output time information to one region of the touch screen 151 by driving the touch screen 151 at a low power.

As shown in FIG. 15B(a), if it is sensed through the proximity sensor that a user's palm is not positioned on a front surface of the touch screen 151 in an off state of the touch screen 151, the controller 180 may determine that the user is holding the body. Here, the controller 180 may turn on the touch screen 151 based on a grip gesture sensed through the grip sensor, and may display a locked screen on the touch screen 151. With such a configuration, even if a home button, a volume button and a power button are not additionally provided on side surfaces of the mobile terminal, functions of such buttons may be executed by the grip sensor.

So far, has been explained a method for manipulating the mobile terminal through the grip sensor.

Figure 16:
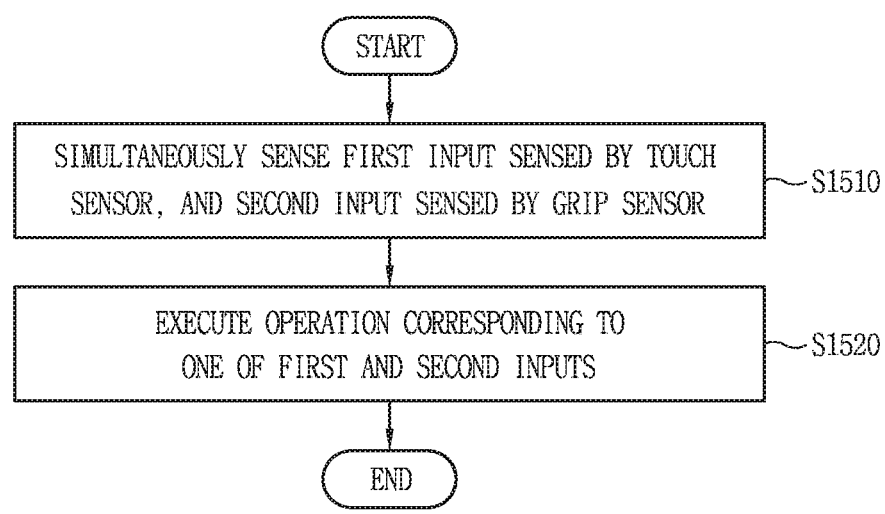
FIG. 16 is a flowchart showing an operation of a mobile terminal when a touch input and a user input sensed through a grip sensor are simultaneously applied.
Figure 17A:
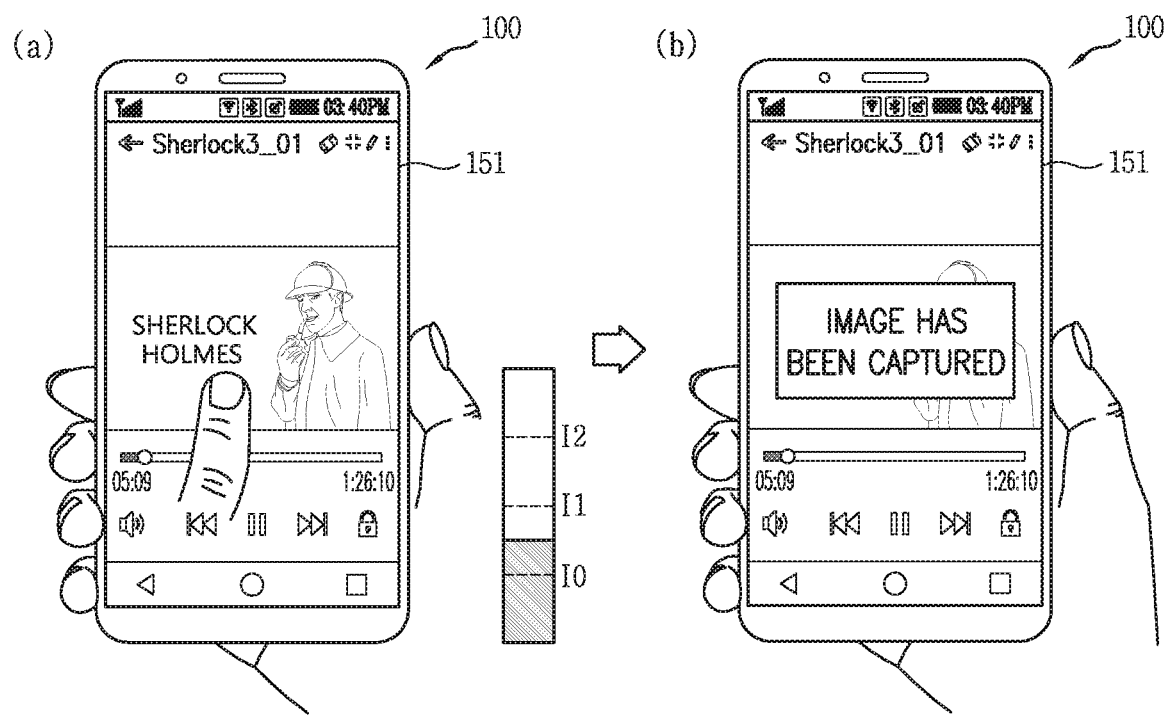
FIGS. 17A and 17B are conceptual views showing embodiments of the operation shown in FIG. 16.
Figure 17B:
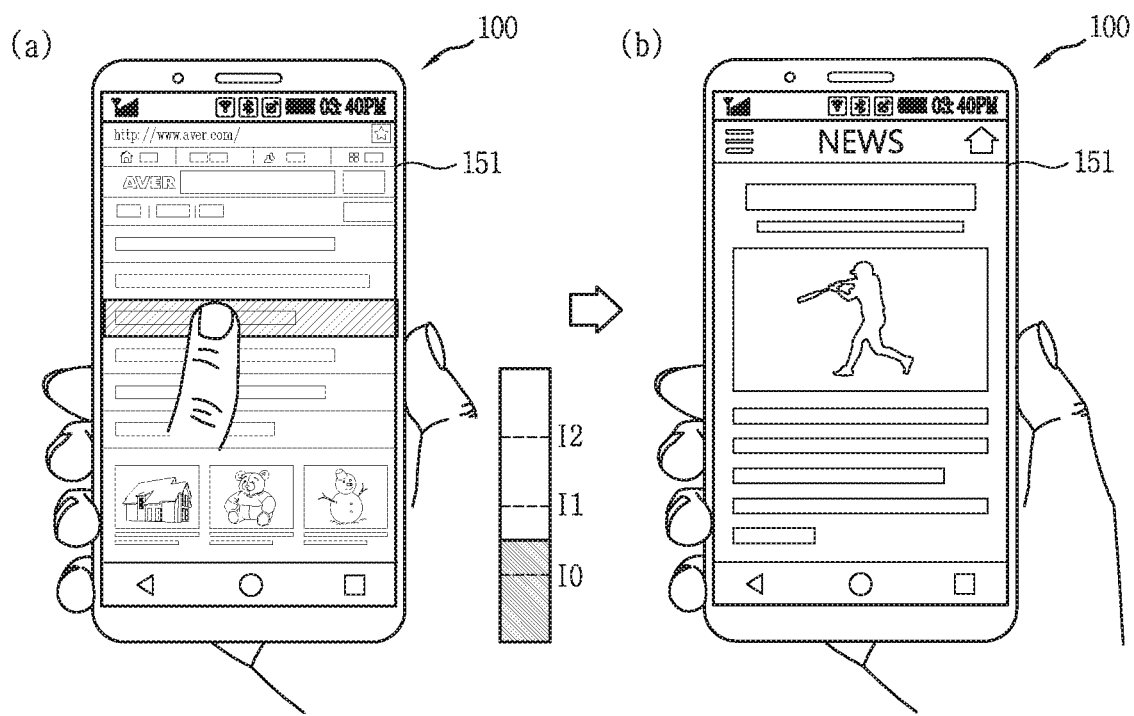

Hereinafter, will be explained a method for operating the mobile terminal when a user input corresponding to an external force applied to both sides of the body and a touch input applied onto the touch screen are simultaneously sensed. FIG. 16 is a flowchart showing an operation of the mobile terminal when a user input corresponding to an external force applied to both sides of the body and a touch input applied onto the touch screen are simultaneously sensed. And FIGS. 17A and 17B are conceptual views showing the operation of FIG. 16.

Referring to FIG. 16, the controller 180 may simultaneously sense a first input sensed by the touch sensor, and a second input sensed by the grip sensor.

The touch sensor has a layered structure with the window of the touch screen 151, and may sense a touch input applied to the touch screen 151. In the following descriptions, the first input means a touch input applied onto the touch screen 151.

The second input is a user input corresponding to an external force applied to both sides of the body, the user input sensed by the grip sensor.

Referring to FIG. 17A(a), a play screen of a video being played may be output to the touch screen 151. The controller 180 may simultaneously or sequentially sense a first input applied to the play screen of the video, and a second input corresponding to an external force applied to both sides of the body.

In this case, the controller 180 may execute an operation corresponding to one of the first and second inputs (S1520).

If two or more different user inputs are simultaneously applied, the controller 180 may execute an operation corresponding to one of the two or more different user inputs, based on a preset condition. Alternatively, the controller 180 may simultaneously or sequentially execute operations corresponding to the two or more different user inputs. In this case, the controller 180 may sequentially execute different operations according to an input order of the user inputs.

Hereinafter, will be explained a method for executing an operation corresponding to one input based on a preset condition.

The preset condition may be a condition related to a type of screen information being output to the touch screen. That is, priorities of a first input and a second input may be changed according to a type of screen information being output to the touch screen. For instance, as shown in FIGS. 17A(a) and (b), if a type of screen information is a video play screen, the controller 180 may determine that a touch input applied to the touch screen is an erroneous input, and may set a second input (a user input corresponding to an external force) to have a higher priority than a first input (a touch input). Thus, the controller 180 may execute a screen capturing function with respect to a video play screen based on a second input.

As another example, as shown in FIGS. 17B(a) and (b), if a type of screen information is a web page, the controller 180 may determine that a user input corresponding to an external force applied to both sides of the body is an erroneous input, and may set a first input (a touch input) to have a higher priority than a second input (a user input corresponding to an external force). Thus, as shown in FIG. 17B(b), the mobile terminal may access a URL address corresponding to the screen information to which the first input has been applied.

On the other hand, the preset condition may be set such that a touch input may always have a higher priority than a user input corresponding to an external force. Alternatively, the preset condition may be set such that a user input corresponding to an external force may always have a higher priority than a touch input. The preset condition may be set by user's selection or by a manufacturing company of the mobile terminal.

The mobile terminal according to the embodiment of the present invention may have the following advantages.

Firstly, complicated functions of the mobile terminal are controlled by a novel manipulation method. This may provide user convenience in manipulating the mobile terminal.

Further, the mobile terminal can be manipulated through a natural gesture to hold the mobile terminal. This may provide a manipulation method more familiar to a user.

Further, a view of visual information displayed on the touch screen may be obtained and a function related to the visual information may be executed, through a user input applied to side surfaces of the touch screen, rather than a user input applied to the touch screen itself. This may allow a user to manipulate the mobile terminal without blocking visual information displayed on the touch screen.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
    a body including a front surface and side surfaces connected to the front surface;
    a touch screen mounted on the body;
    a sensor coupled to at least one of the side surfaces and configured to sense a user input received on the at least one of the side surfaces; and
    a controller configured to:
        perform a first function when the user input is received at a first portion of the sensor;
        perform a second function that is different from the first function when the user input is received at a second portion of the sensor that is different from the first portion;
        cause the touch screen to display a video play screen of a video;
        when an intensity of an external force sensed on one surface of the side surfaces is higher than an intensity of an external force sensed on another surface of the side surfaces, execute a rewinding function of the video; and
        when an intensity of an external force sensed on the another surface is higher than an intensity of an external force sensed on the one surface, execute a fast-forward function of the video.

2. The mobile terminal of claim 1, wherein the first function includes scrolling, and the second function includes at least one of selection and output of a pop-up window.

3. The mobile terminal of claim 1, wherein in response to sensing of an external force applied to the side surfaces in a state where the touch screen is in an off state, the controller is further configured to:
    convert the touch screen into an on state; and
    perform an iris recognition function to release a locked state through iris recognition.

4. The mobile terminal of claim 3, wherein a screen to input iris information is displayed on the touch screen based on performing of the iris recognition function.

5. The mobile terminal of claim 1, wherein the controller is further configured to:
    display a list of messages on the touch screen,
    select a message included in the list of messages based on a touch input applied to one portion of the sensor,
    when an external force applied to at least one of the side surfaces has an intensity of more than a first preset value, display a content of the selected message in a first manner, and
    when an external force applied to at least one of the side surfaces has an intensity of more than a second preset value greater than the first preset value, display the content of the selected message in a second manner different from the first manner.

6. The mobile terminal of claim 5, wherein displaying the content of the selected message in the first manner is outputting the content of the selected message to a pop-up window on a screen where the list of messages is displayed, and
    displaying the content of the selected message in the second manner is outputting only the content of the selected message without the list of messages.

7. The mobile terminal of claim 5, wherein the controller is further configured to scroll the list of messages based on a drag input applied to one of the side surfaces.

8. The mobile terminal of claim 7, wherein the selected one message is changed based on the drag input.

9. The mobile terminal of claim 1, wherein the controller is further configured to:
    cause the touchscreen to display a content of a message;
    when an external force, which is applied to at least one of the side surfaces while the content of the message is displayed, has an intensity of more than a preset value, execute a file attached to the message; and
    when an external force, which is applied to at least one of the side surfaces for more than a preset time while the content of the message is displayed, has an intensity of more than the preset value, cause the touch screen to display a home screen.

10. The mobile terminal of claim 1, wherein the controller is further configured to:
   when an external force having an intensity more than a preset value is sensed while the video is played, pause the video; and
   when an external force having an intensity more than the preset value is sensed while the video is paused, re-play the video.

11. The mobile terminal of claim 1, wherein the rewinding function is a function to change a play time of the video to a previous play time earlier than a current play time, and
   the fast-forward function is a function to change a play time of the video to a subsequent play time later than a current play time.

12. The mobile terminal of claim 1, wherein in a horizontal posture of the mobile terminal, the controller is further configured to:
   when an intensity of an external force sensed on a left portion of the side surfaces is higher than an intensity of an external force sensed on a right portion of the side surfaces, execute a third function related to the video; and
   when an intensity of an external force sensed on the right portion is higher than an intensity of an external force sensed on the left portion, execute a fourth function related to the video, wherein the third function is different from the fourth function.

13. The mobile terminal of claim 1, wherein in a horizontal posture of the mobile terminal, the controller is further configured to:
   cause the touch screen to display a preview image received through a camera mounted on the body,
   when an external force applied to the side surfaces of the body has an intensity of more than a first preset value, reset a focal position such that a focal point of the camera is positioned on a subject,
   when an external force applied to the side surfaces of the body has an intensity of more than a second preset value greater than the first preset value, capture the preview image, and
   when an external force applied to the side surfaces of the body has an intensity of more than the second preset value for more than a preset time, capture a plurality of images.

14. The mobile terminal of claim 1, wherein the sensor comprises a plurality of sensors such that at least one sensor is coupled to one side surface and at least one sensor is coupled to another side surface.

15. The mobile terminal of claim 1, wherein a plurality of sensors are coupled to one of the side surfaces.

16. The mobile terminal of claim 1, wherein the sensor is coupled to the at least one of the side surfaces such that no button is provided on the side surfaces.

* * * * *